(12) United States Patent
Sogabe et al.

(10) Patent No.: US 8,323,082 B2
(45) Date of Patent: Dec. 4, 2012

(54) GAME DEVICE, RECORDING MEDIUM AND GAME CONTROL METHOD

(75) Inventors: Daisuke Sogabe, Toyonaka (JP); Masafumi Yoshida, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/290,323

(22) Filed: Nov. 7, 2011

(65) Prior Publication Data
US 2012/0115556 A1 May 10, 2012

(30) Foreign Application Priority Data
Nov. 10, 2010 (JP) .................................. 2010-251908

(51) Int. Cl.
*A63F 13/00* (2006.01)
(52) U.S. Cl. ............................................. 463/3; 463/36
(58) Field of Classification Search ........... 463/3, 29–37
See application file for complete search history.

(56) References Cited

U.S. PATENT DOCUMENTS

| | | | |
|---|---|---|---|
| 8,012,003 B2 * | 9/2011 | Sterchi et al. ...................... 463/3 |
| 8,033,914 B2 * | 10/2011 | Yoshikawa et al. ............. 463/36 |
| 8,096,876 B2 * | 1/2012 | Beaudry ........................ 463/31 |
| 2002/0177477 A1 * | 11/2002 | Okitsu et al. ...................... 463/3 |
| 2006/0128468 A1 * | 6/2006 | Yoshikawa et al. ............. 463/36 |
| 2007/0013652 A1 * | 1/2007 | Kim et al. ...................... 345/156 |
| 2007/0155457 A1 * | 7/2007 | Fujioka et al. .................... 463/3 |
| 2008/0182686 A1 * | 7/2008 | Kellogg ........................ 473/451 |
| 2009/0170579 A1 * | 7/2009 | Ishii et al. ......................... 463/2 |
| 2011/0269542 A1 * | 11/2011 | Ueshima et al. ................ 463/36 |

FOREIGN PATENT DOCUMENTS

JP 2006-246968 9/2006
JP 3822222 9/2006

\* cited by examiner

*Primary Examiner* — Masud Ahmed
(74) *Attorney, Agent, or Firm* — Jordan and Hamburg LLP

(57) ABSTRACT

A game device which executes a baseball game where a batter character hits a ball object that is pitched by a pitcher character stores, for each batter character, first evaluation information showing an evaluation of battering power in each segment showing a region within a strike zone, and displays the region of the strike zone corresponding to respective segments after increasing transparency, as divergence from the first reference data of the first evaluation information increases, based on the first evaluation information of the batter character at bat.

9 Claims, 20 Drawing Sheets

| PLAYER IDENTIFIER | SEGMENT INFORMATION | | | | | | | | |
|---|---|---|---|---|---|---|---|---|---|
| | a | b | c | d | e | f | g | h | i |
| PLAYER 01 | 1 | 3 | 3 | 3 | 3 | 3 | 3 | 3 | 3 |
| PLAYER 02 | 1 | 3 | 3 | 4 | 5 | 4 | 3 | 3 | 2 |
| ⋮ | ⋮ | ⋮ | ⋮ | ⋮ | ⋮ | ⋮ | ⋮ | ⋮ | ⋮ |

FIG. 8A   FIG. 8B   FIG. 8C
REFERENCE
LEVEL
DIFFERENCE
| 3 | 0 | 0 |
|---|---|---|
| 0 | 0 | 0 |
| 0 | 0 | 0 |
| 3 | 1 | 1 |
|---|---|---|
| 1 | 1 | 1 |
| 1 | 1 | 2 |
| 3 | 0 | 0 |
|---|---|---|
| 0 | 0 | 0 |
| 3 | 0 | 0 |
  
TRANSPARENCY (%)
| 90 | 60 | 60 |
|----|----|----|
| 60 | 60 | 60 |
| 60 | 60 | 60 |
| 90 | 70 | 70 |
|----|----|----|
| 70 | 70 | 70 |
| 70 | 70 | 80 |
| 90 | 60 | 60 |
|----|----|----|
| 60 | 60 | 60 |
| 90 | 60 | 60 |
  
DISPLAY
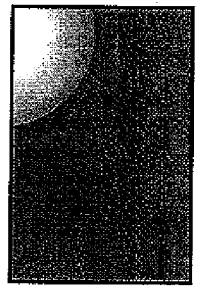 

FIG. 9A
FIG. 9B
REFERENCE
LEVEL
DIFFERENCE
| 3 | 0 | 3 |
|---|---|---|
| 0 | 0 | 0 |
| 3 | 0 | 3 |
| 2 | 1 | 0 |
|---|---|---|
| 1 | 1 | 1 |
| 1 | 1 | 1 |
↓
↓
TRANSPARENCY
(%)
| 90 | 60 | 90 |
|----|----|----|
| 60 | 60 | 60 |
| 90 | 60 | 90 |
| 80 | 70 | 60 |
|----|----|----|
| 70 | 70 | 70 |
| 70 | 70 | 70 |
↓
↓
DISPLAY
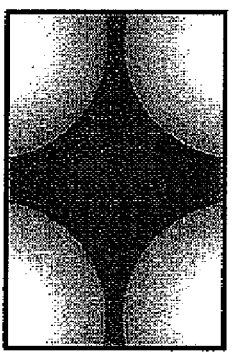
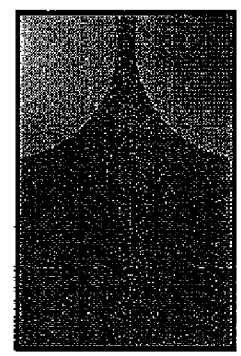

| SETTING VALUE | REFERENCE LEVEL DIFFERENCE | BASIC CAPABILITY LEVEL | TRANSPARENCY (%) |
|---|---|---|---|
| 5 | 0 | 3 | 50 |
| | | 2 | 53 |
| | | 1 | 56 |
| 4 | 0 | 3 | 60 |
| | | 2 | 63 |
| | | 1 | 66 |
| 3 | 1 | 3 | 70 |
| | | 2 | 73 |
| | | 1 | 76 |
| 2 | 2 | 3 | 80 |
| | | 2 | 83 |
| | | 1 | 86 |
| 1 | 3 | 3 | 90 |
| | | 2 | 93 |
| | | 1 | 96 |

2101, 2102, 2103, 2104

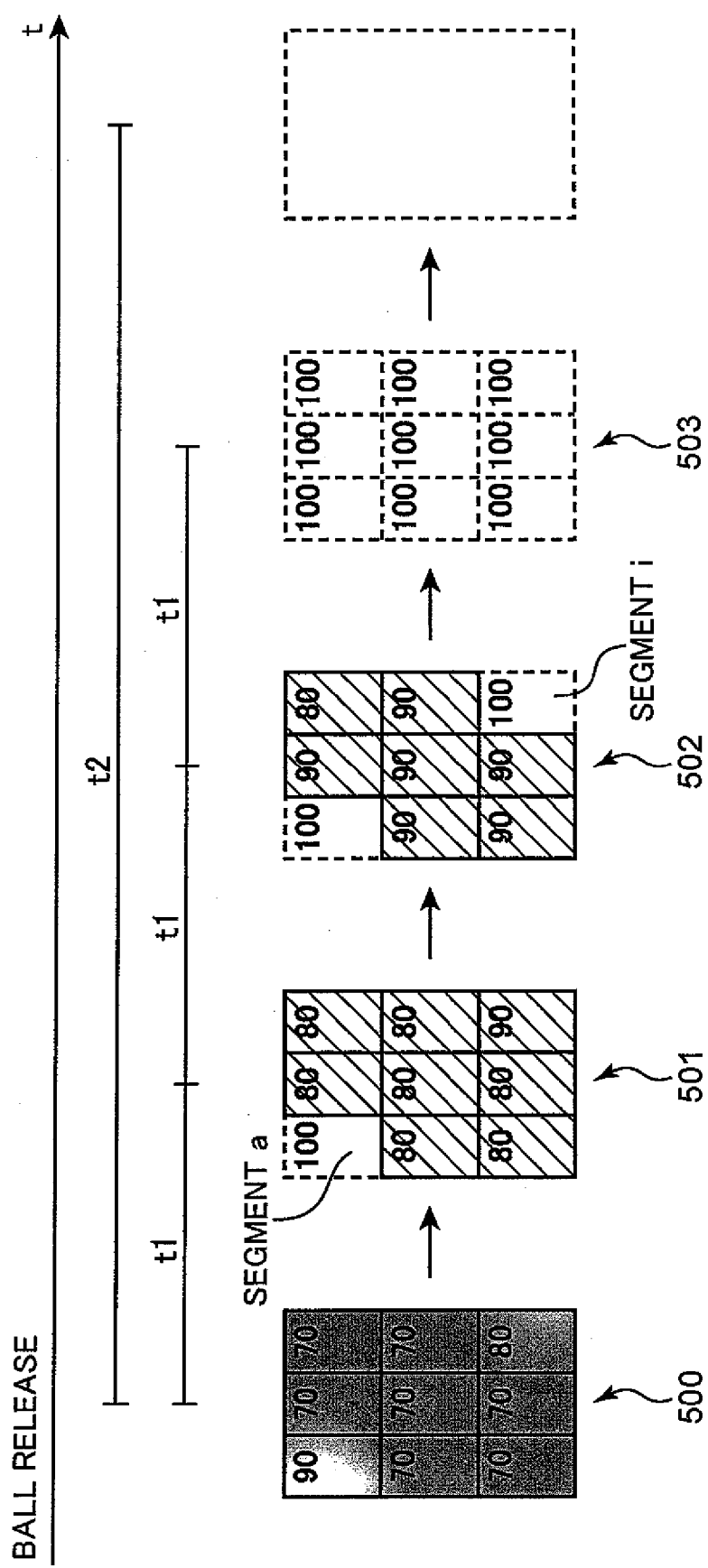

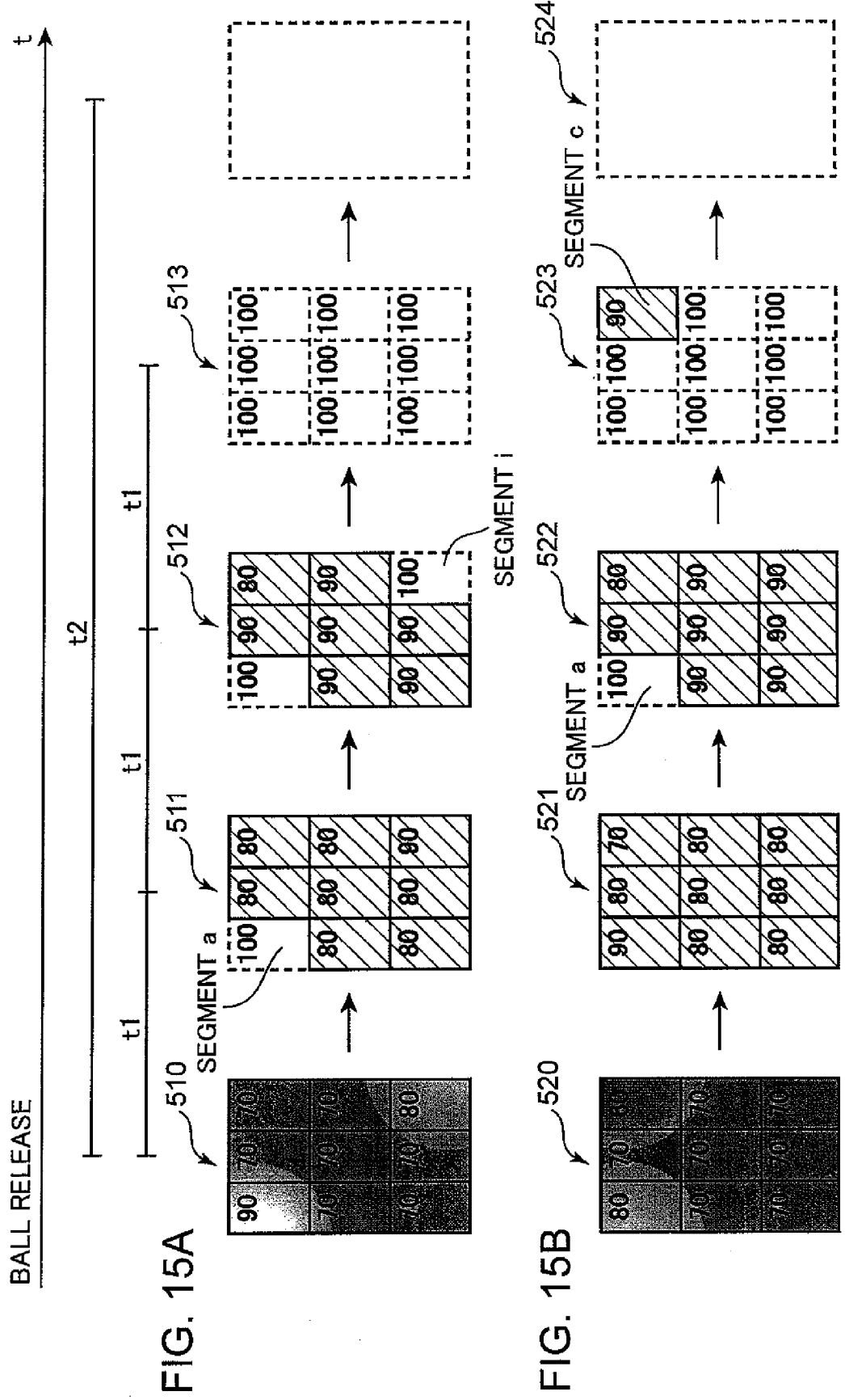

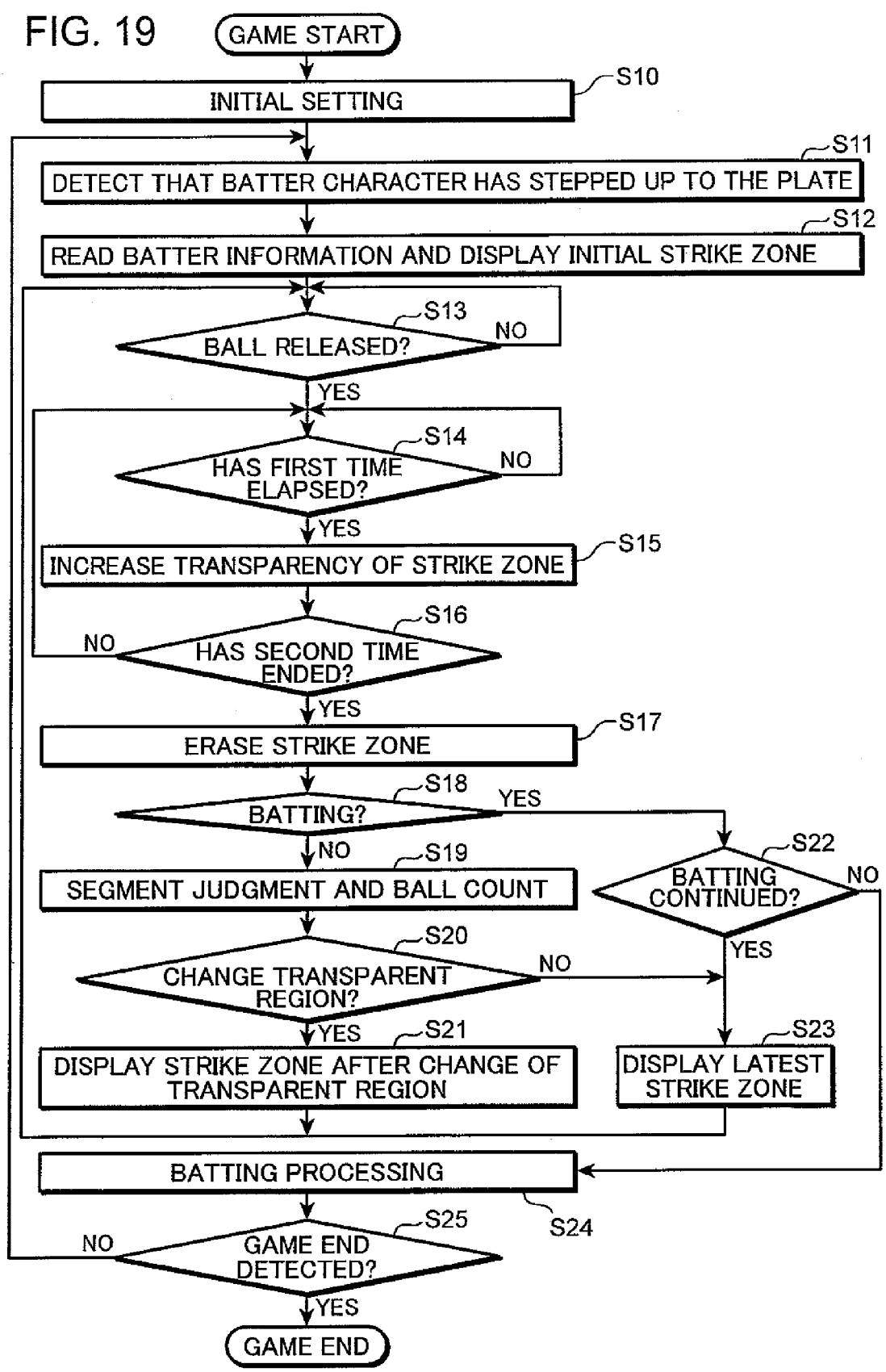

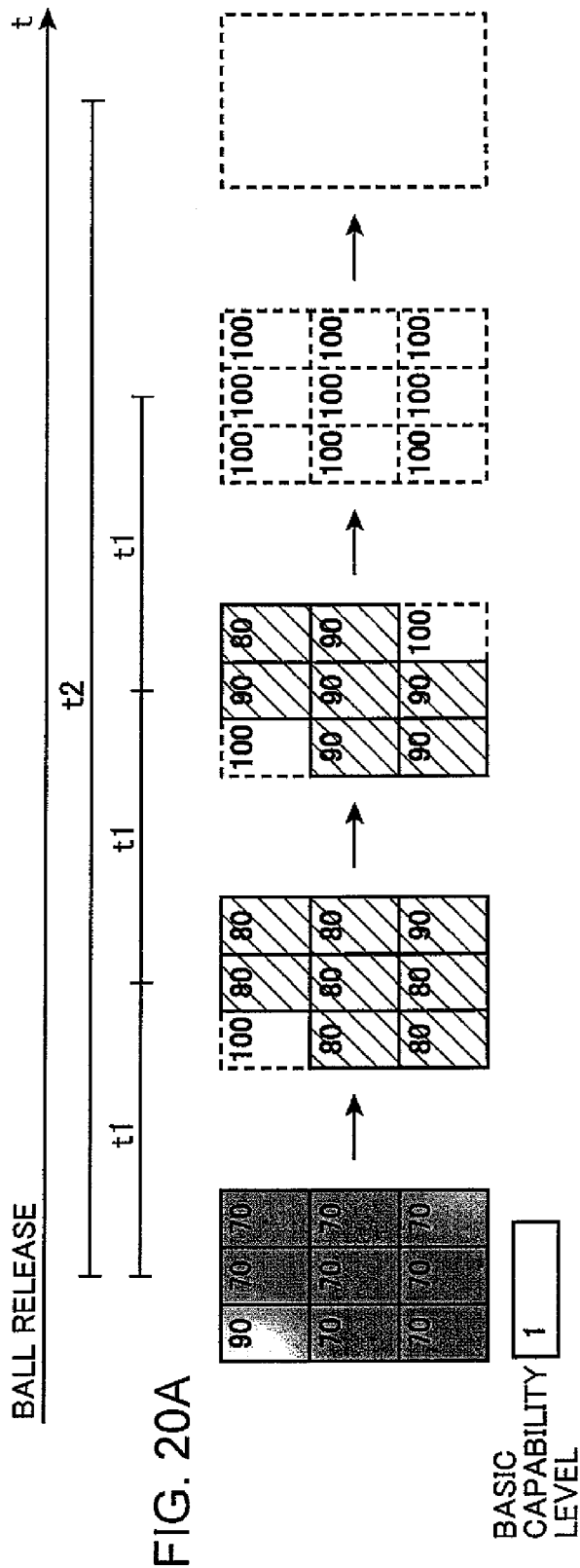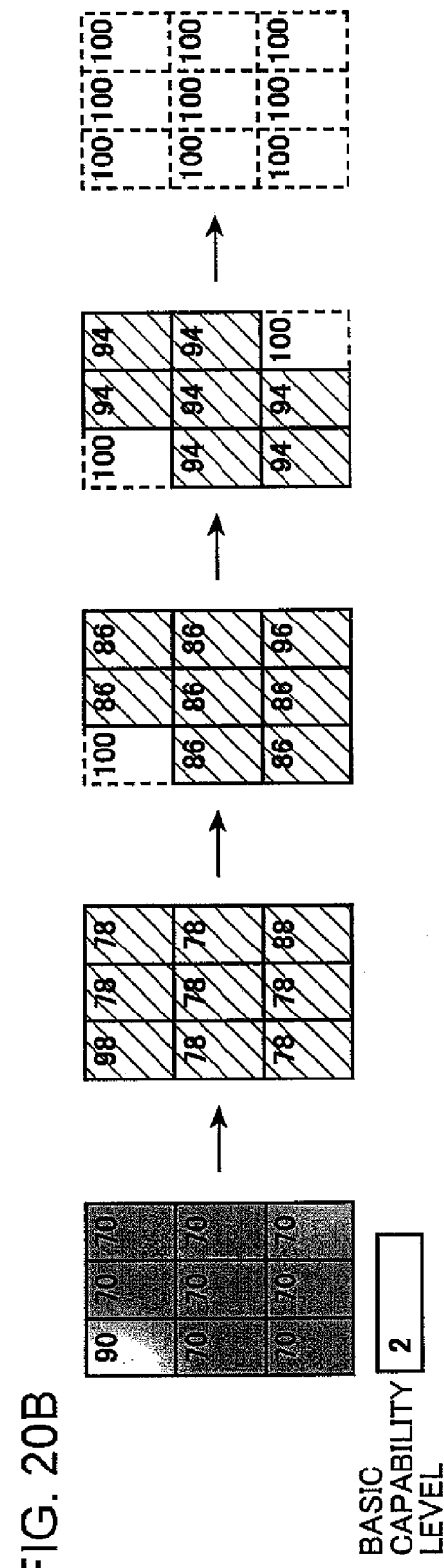

FIG. 21A

| 6 | ⑩ | ⑩ |
|---|---|---|
| ⑩ | ⑩ | ⑩ |
| ⑩ | 8 | 7 |

FIG. 21B

| 4 | ⓪ | ⓪ |
|---|---|---|
| ⓪ | ⓪ | ⓪ |
| ⓪ | 2 | 3 |

FIG. 21C

| 1 | 2 | 3 |
|---|---|---|
| 4 | 5 | 6 |
| 7 | 8 | ⑨ |

FIG. 21D

| 9 | 8 | 7 |
|---|---|---|
| 6 | 5 | 4 |
| 3 | 2 | ① |

GAME DEVICE, RECORDING MEDIUM AND GAME CONTROL METHOD

BACKGROUND OF THE INVENTION

1. Field of the Invention

The present invention relates to technology of controlling the progress of a baseball game where a batter character hits a ball object that is pitched by a pitcher character.

2. Description of the Related Art

Conventionally, known is a baseball game where an outline box showing a strike zone is displayed on a display screen, and the batter character hits the ball object that was pitched by the pitcher character toward a strike zone.

In recent baseball games, there are those which give each batter a hitting zone where that batter is skilled at hitting and a hitting zone where that batter is not so skilled at hitting as in real baseball. For example, a batter may be skilled at hitting high and inside, but not so skilled at hitting low and outside.

As this type of game, for example, proposed is a game which displays a ball meeting zone (hereinafter referred to as the "ball meeting cursor") of the bat cursor displayed within the strike zone to be a large size around the hitting zone where the batter character is skilled at hitting, and to be a small size around the hitting zone where the batter character is not so skilled at hitting (refer to JP2006-246968). A ball meeting cursor is used for the batter character to hit the ball object. When the game player performs a predetermined operation when the ball meeting cursor is overlapped with the ball object, it is determined that the batter character was able to hit the ball object.

Accordingly, since it becomes easier to overlap with the ball object as the size of the ball meeting cursor becomes larger, the skillfulness or unskillfulness of the batter character for each hitting zone is reflected in game, and the amusement as a baseball game will increase.

Nevertheless, as the game player becomes familiar with the batting operation of this kind of baseball game, that game player will be able to overlap the ball meeting cursor with the ball object even when the size of the ball meeting cursor is small size, and in many cases that game player will be able to hit the ball object relatively easily even in a hitting zone where that the batter character is not skilled at hitting.

In other words, there were cases where it was difficult to reflect the skillfulness or unskillfulness of the batter character for each hitting zone in the game.

SUMMARY OF THE INVENTION

An object of this invention is to provide a game device, a game control program, and a game control method capable of reflecting the skillfulness or unskillfulness of the batter character for each hitting zone in the game regardless of the game player's proficiency of the batting operation.

The game device according to one aspect of the present invention is a game device which executes a baseball game where a batter character hits a ball object that is pitched by a pitcher character. This game device has a strike zone display unit which displays a strike zone that is pre-set in a game space, and a batter information storage unit which stores, for each batter character, first evaluation information showing an evaluation of battering power in each segment showing a region within the strike zone. The first evaluation information stored in the batter storage unit is data that shows a level of unskillfulness of batting for each segment and that is set so that the unskillfulness is intensified as divergence from first reference data showing a predetermined level increases, and the strike zone display unit displays the region of the strike zone corresponding to respective segments after increasing transparency, as divergence from the first reference data of the first evaluation information is increased, based on the first evaluation information on the batter character at bat among the first evaluation information stored in the batter information storage unit.

In addition, the recording medium according to another aspect of the present invention is a computer-readable recording medium recorded with a program which causes a computer to execute a baseball game where a batter character hits a ball object that is pitched by a pitcher character. This computer-readable recording medium causes the computer to function as a strike zone display unit which displays a strike zone that is pre-set in a game space, and a batter information storage unit which stores, for each batter character, first evaluation information showing an evaluation of battering power in each segment showing a region within the strike zone. The first evaluation information stored in the batter storage unit is data that shows a level of unskillfulness of batting for each segment and that is set so that the unskillfulness is intensified as divergence from first reference data showing a predetermined level increases, and the strike zone display unit displays the region of the strike zone corresponding to respective segments after increasing transparency as divergence from the first reference data of the first evaluation information increases, based on the first evaluation information on the batter character at bat among the first evaluation information stored in the batter information storage unit.

In addition, the game control method according to another aspect of the present invention is a game control method in which a game device executes a baseball game where a batter character hits a ball object that is pitched by a pitcher character. The game device has a batter information storage unit which stores, for each batter character, first evaluation information showing an evaluation of battering power in each segment showing a region within a strike zone that is pre-set in a game space. The first evaluation information stored in the batter storage unit is data that shows a level of unskillfulness of batting for each segment and that is set so that the unskillfulness is intensified as divergence from first reference data showing a predetermined level is increased, and the game device executes a strike zone display step of displaying the region of the strike zone corresponding to respective segments after increasing transparency as divergence from the first reference data of the first evaluation information increases, based on the first evaluation information on the batter character at bat among the first evaluation information stored in the batter information storage unit.

BRIEF DESCRIPTION OF THE DRAWINGS

FIG. 8 is a diagram showing a display example of the strike zone;

FIG. 9 is a diagram showing a display example of the strike zone;

FIG. 11 is a diagram showing an example of the configuration and contents of the basic capability segment transparency table;

FIG. 13 is a diagram showing the erasure method of the strike zone;

FIG. 15 is a diagram showing the erasure time of the strike zone;

FIG. 19 is a flowchart explaining the strike zone display processing of the game device;

FIG. 20 is a diagram showing the erasure method of the strike zone; and

FIG. 21 is a diagram showing a variation of the method of setting the unskillfulness of the respective segments in the strike zone.

DESCRIPTION OF THE PREFERRED EMBODIMENTS

The invention is now described, by way of example, with reference to the accompanying drawings.
<Embodiments>
The game device according to an embodiment of the present invention is now explained with reference to the drawings.
<Hardware Configuration>
In the ensuing explanation, a domestic video game device configured by connecting a domestic video game machine to a domestic television is explained as an example of the game device. However, the present invention is not limited thereto, and can also be applied to a portable game device or mobile phone configured integrally with a monitor, or a personal computer or the like that functions as a game device as a result of executing the game control program of the present invention.

Figure 1:
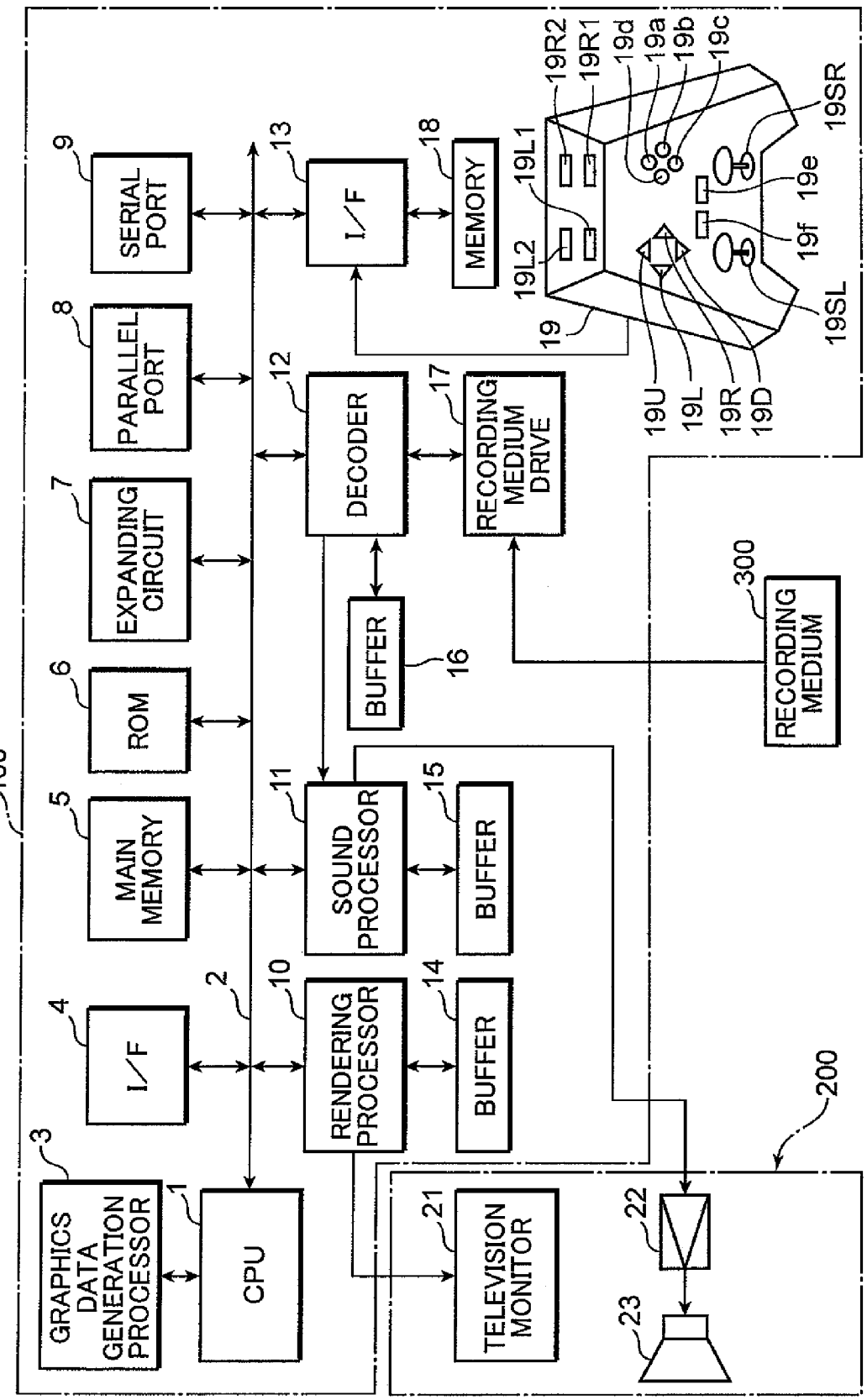
FIG. 1 is a block diagram showing the configuration of the game device of an embodiment of the present invention.

FIG. 1 is a block diagram showing the configuration of the game device 1000 according to an embodiment of the present invention.

The game device 1000 shown in FIG. 1 is configured by comprising a domestic game machine 100 and a television 200.

When the domestic game machine 100 is loaded with a computer-readable recording medium 300 having a game program recorded thereon, the domestic game machine 100 reads the game as needed and executes the game.

The domestic game machine 100 includes a CPU (Central Processing Unit) 1, a bus line 2, a graphics data generation processor 3, an interface circuit (I/F) 4, a main memory 5, a ROM (Read Only Memory) 6, an expanding circuit 7, a parallel port 8, a serial port 9, a rendering processor 10, a sound processor 11, a decoder 12, an interface circuit (I/F) 13, buffers 14 to 16, a recording medium drive 17, a memory 18, and a controller 19.

Moreover, the television 200 includes a television monitor 21, an amplification circuit 22 and a speaker 23.

The CPU 1 of the domestic game machine 100 is connected to the bus line 2 and the graphics data generation processor 3.

The bus line 2 includes an address bus, a data bus, a control bus and the like, and mutually connects the CPU 1, the interface circuit 4, the main memory 5, the ROM 6, the expanding circuit 7, the parallel port 8, the serial port 9, the rendering processor 10, the sound processor 11, the decoder 12 and the interface circuit 13.

The rendering processor 10 is connected to the buffer 14, and the television monitor 21 of the television 200.

The sound processor 11 is connected to the buffer 15, the amplification circuit 22, and the amplification circuit 22 of the television 200.

The decoder 12 is connected to the buffer 16 and the recording medium drive 17.

The interface circuit 13 is connected to the memory 18 and the controller 19.

The speaker 23 of the television 200 is connected to the amplification circuit 22.

When the game device 1000 is configured based on a personal computer, a workstation or the like, for instance, the television monitor 21 or the like corresponds to a computer display. Moreover, the expanding circuit 7, the rendering processor 10, the sound processor 11 and the like respectively correspond to a part of the data of the game control program recorded on the recording medium 300 or the hardware on the expansion board that is inserted into the expansion slot of the computer. Moreover, the interface circuit 4, the parallel port 8, the serial port 9 and the interface circuit 13 correspond to the hardware on the expansion board that is inserted into the expansion slot of the computer, and the buffers 14 to 16 respectively correspond to the respective storage areas of the main memory 5 or the expanded memory.

The respective constituent elements shown in FIG. 1 are now explained.

The graphics data generation processor 3 is a processor which plays the role of the co-processor of the CPU 1 so to speak. In other words, the graphics data generation processor 3 performs coordinate conversion and light source calculation; specifically, the computation of a fixed-point format matrix or vector based on parallel processing.

The main processing that is performed by the graphics data generation processor 3 includes, for example, processing of obtaining the display position of the game character and the like and returning this to be CPU 1 based on the coordinate data, travel distance data, and rotation data of the respective vertices in a two-dimensional or three-dimensional space of the image data supplied by the CPU 1, and processing of calculating the brightness of the image according to the distance from the light source that was virtually set.

The interface circuit 4 is used as the interface of a peripheral device; for example, a pointing device such as a mouse or a track ball.

The main memory 5 is configured from a RAM (Random Access Memory) or the like, and is used for temporarily storing programs and data during the actual execution of the program.

The ROM 6 stores program data to become the operating system of the game device 1000.

The expanding circuit 7 has a function of performing expansion processing to a compressed image. A compressed image is, for example, an image that was compressed based on coding that is compliant with the MPEG (Moving Picture Experts Group) for moving pictures and the JPEG (Joint Photographic Experts Group) standard for still pictures.

The parallel port 8 and the serial port 9 are physical interfaces for connecting the domestic game machine 100 to the peripheral devices.

The rendering processor 10 has the function of performing rendering processing using the buffer 14 based on the rendering command that is issued by the CPU 1 each predetermined time T. The predetermined time T is, for example, 1/60 seconds upon rendering 60 frames per second.

The buffer 14 is configured, for example, from a RAM, and stores image data such as the characters, background and color that are used by the rendering processor 10 in the game, and frame data to be displayed on the television monitor 21.

Objects such as characters in the game space are configured from a plurality of polygons. The game player operates the characters displayed on the television monitor 21 by using the controller 19 described later.

For example, when an operation for moving the character is performed, the CPU 1 that detected such operation sequentially causes the graphics data generation processor 3 to obtain the three-dimensional coordinate data of the polygons configuring the moving character.

The rendering processor 10 creates display data of sequentially moving the character based on the sequentially obtained coordinate data, writes this into the buffer 14, and displays this on the television monitor 21.

The sound processor 11 stores, in the buffer 15, sound data that was read from the recording medium 300; for instance, sound data that was digitized according to the ADPCM (Adaptive Differential Pulse Code Modulation). In addition, as needed, the sound processor 11 reads the sound data from the buffer 15 at a sampling frequency in which the sound data was digitized, decodes the read sound data, and outputs the sound from the speaker 23.

The decoder 12 performs error correction processing based on ECC (Error Correction Code) to data that was received from the recording medium drive 17, and supplies the data that was subject to the error correction processing to the main memory 5 or the sound processor 11.

The recording medium drive 17 reads the image data, sound data and program data from the recording medium 300, and sends the read data to the decoder 12.

The recording medium drive 17 is, for example, a DVD-ROM drive, a CD-ROM drive, a hard disk drive, an optical disk drive, a flexible disk drive, a silicon disk drive, a cassette medium readable machine or the like is used. As the recording medium 300, a DVD-ROM, a CD-ROM, a hard disk, an optical disk, a flexible disk, a semiconductor memory or the like is used.

The memory 18 is a memory for maintaining the various game parameters at the time that the game is paused such as when the game is paused. For example, a nonvolatile and portable card-type memory can be used.

The controller 19 is an operation device that is used by the game player as the operator for inputting various operation commands. The controller 19 sends operation signals according to the game player's operation to the CPU 1 via the interface circuit 13.

The controller 19 is provided with a first button 19a, a second button 19b, a third button 19c, a fourth button 19d, an up direction key 19U, a down direction key 19D, a left direction key 19L, a right direction key 19R, an L1 button 19L1, an L2 button 19L2, an R1 button 19R1, an R2 button 19R2, a start button 19e, a select button 19f, a left stick 19SL and a right stick 19SR.

The up direction key 19U, the down direction key 19D, the left direction key 19L and the right direction key 19R are used, for example, to provide, to the CPU 1, commands for moving the character or the cursor vertically or horizontally on the screen of the television monitor 21.

The start button 19e is used for commanding the CPU 1 to load the game program from the recording medium 300. The select button 19f is used for commanding the CPU 1 to make various selections concerning the game program that is loaded from the recording medium 300 to the main memory 5.

The respective buttons and respective keys of the controller 19 excluding the left stick 19SL and the right stick 19SR are configured as ON/OFF switches which are turned ON when they are pressed from their neutral position based on external pressing force, and turned OFF when the pressing force is released and they are returned to their neutral position.

The left stick 19SL and the right stick 19SR are stick-type controllers which are basically configured the same as a so-called joystick. The stick-type controller includes an upstanding stick, and is configured so that it can be tilted 360°, including front/back and left/right, with a predetermined position of the stick as the fulcrum. The left stick 19SL and the right stick 19SR send as the operational signals, values of the x coordinates of the left/right direction and the y coordinates of the front/back direction with the upstanding position as the origin according to the tilting direction and tilting angle of the stick.

Note that the first button 19a, the second button 19b, the third button 19c, the fourth button 19d, the L1 button 19L1, the L2 button 19L2, the R1 button 19R1 and the R2 button 19R2 are used for the various functions according to the game control program that is loaded from the recording medium 300.

The outline of the operation of the foregoing game device 1000 is now explained.

When the recording medium 300 is loaded in the recording medium drive 17, the power switch (not shown) is turned ON and power is applied to the game device 1000, the CPU 1 executes the boot program stored in the ROM 6 to boot the operating system, and thereafter commands the recording medium drive 17 to read the game program from the recording medium 300.

The recording medium drive 17 reads the image data, sound data and program data from the recording medium 300, and sends these to the decoder 12.

The decoder 12 performs error correction processing to the received image data, sound data and program data, and sends the image data that was subject to error correction processing to the expanding circuit 7 via the bus line 2.

The expanding circuit 7 performs expansion processing to the received image data, sends the image data that was subject to expansion processing to the rendering processor 10, and the rendering processor 10 writes the received image data into the buffer 14, and displays this on the television monitor 21 of the television 200.

Moreover, the decoder 12 sends the sound data that was subject to error correction processing to the sound processor 11 via the bus line 2. The sound processor 11 writes the received sound data into the buffer 15.

Moreover, the decoder 12 writes the program data that was subject to error correction processing into the main memory 5.

Thereafter, the CPU 1 advances the game based on the program data (game control program) stored in the main memory 5 and the contents that were instructed by the game player using the controller 19. In other words, the CPU 1 advances the game by appropriately controlling image processing, controlling sound processing and controlling internal processing according to the contents that were instructed by the game player using the controller 19.

<Baseball Game>

Prior to explaining the functional configuration of the game device 1000, the game to be executed based on the game program stored in the recording medium 300 is explained with reference to FIG. 2. The game in this embodiment is themed on a baseball game (including a softball game).

Figure 2:
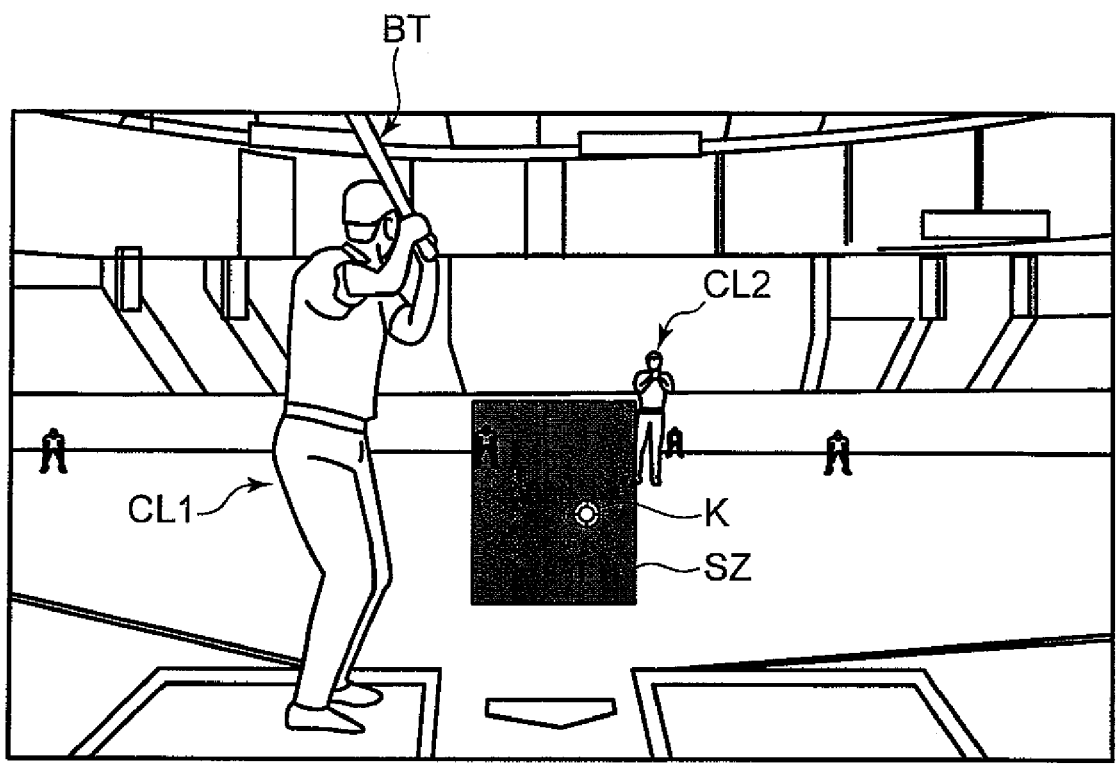
FIG. 2 is a screen diagram explaining the outline of the baseball game that is executed by the game device according to this embodiment.

FIG. 2 is a diagram of the game screen explaining the outline of the baseball game to be executed by the game device 1000 according to this embodiment.

This baseball game is a game where, in a game space which is a virtual three-dimensional space, the batter character CL1 hits the ball object BL that was pitched by the pitcher character CL2.

Specifically, as shown in FIG. 2, this baseball game is a baseball game where the pitcher character CL2 pitches the ball object BL, and the batter character CL1 hits the ball object BL using the bat object BT.

In this baseball game, when the game player is playing offense, the game player operates the controller 19 to move the ball meeting cursor K displayed within the strike zone SZ on the display screen, overlap the ball meeting cursor K with the ball object BL when the ball object BL reaches near home base, and then inputs the batting command. Consequently, the bat object BT being swung is displayed, and the ball object BL is hit.

With the baseball game of this embodiment, the display mode of the strike zone SZ is different according to the capability of the batter character CL1. In other words, as a result of causing the display mode of the strike zone SZ to differ according to the capability of the batter character CL1, the capability of the batter character CL1 can be reflected in the game regardless of the proficiency of the game player.

<Display Mode of Strike Zone>

The display mode of the strike zone SZ to be displayed by the game device 1000 is now explained.

In real baseball, each batter has a skillful hitting zone and an unskillful hitting zone. For example, a batter may be skilled at hitting high and inside but unskilled at hitting low and outside.

In this embodiment, as a result of the strike zone SZ corresponding to the unskillful segment being difficult to recognize, it will be difficult even for a game player, who is proficient with the operation of overlapping the ball meeting cursor with the ball, to hit the ball. In other words, since it is difficult to recognize the strike zone SZ, the game player is unable to move the ball meeting cursor K with the strike zone SZ as the reference, and it becomes difficult to overlap the ball meeting curser K with the ball object BL. Moreover, since it also becomes difficult to determine whether the ball is in the strike zone, the judgment on whether to let the ball go or hit it will also become difficult.

In this embodiment, there are basically two methods of making it difficult to recognize the strike zone SZ.

The first method is to feather the strike zone SZ near the unskillful segment to make it difficult to see. Specifically, the transparency of the region near the unskillful segment of the strike zone SZ is increased upon display.

The second method is to gradually lighten the display with the lapse of time; that is, gradually increase the transparency upon erasing the strike zone SZ.

Upon using the ball meeting curser K to hit the ball object BL that was pitched by the pitcher character CL2, it is easy to hit the ball if the strike zone SZ is displayed until the ball is actually hit. Accordingly, batting becomes difficult by feathering the strike zone SZ near the unskillful segment.

Moreover, by gradually increasing the transparency according to the lapse of time, the area near the unskillful segment that is displayed with high transparency in the initial state when the strike zone SZ is initially displayed will disappear quickly, and it will become difficult to hit the ball object BL with the ball meeting curser K.

In this embodiment, the transparency of the overall strike zone SZ of the initial state is additionally changed based on the basic capability of the batter character CL1 as a batter. For example, even if the unskillful segment is the same, the strike zone SZ that is displayed when a batter character CL1 with high basic capability steps up to the plate will be displayed thicker; that is, it will be displayed with lower transparency, than the strike zone SZ that is displayed when a batter character CL1 with low basic capability steps up to the plate.

As a result of the overall strike zone SZ being displayed thickly, the area near the unskillful segment will also be displayed thickly, and batting will be easier even in an unskillful segment in comparison to a batter character CL1 with low basic capability, and the basically capability of the batter character CL1 can thereby be reflected. Moreover, even when erasing the strike zone SZ, since the time until erasure will be prolonged, it will be easier for a batter character CL1 with high basic capability to hit the ball, even in an unskilled segment, in comparison to a batter character CL1 with lower basic capability. In other words, the difficulty of batting is not uniform even in the same unskillful segment, and the basic capability of the respective batter characters will be reflected. Thus, the reality will increase and the amusement of the game will also increase.

In addition, when a ball is pitched to the same unskillful segment several times, an actual batter will gradually become accustomed and the probability of hitting a ball, even in an unskillful segment, usually increases. Thus, in this embodiment, when the ball object BL passes near the unskillful segment while the batter character CL1 is at bat, it is deemed that the batter character CL1 has become accustomed to that unskillful segment, and the region of high transparency is reduced. Consequently, it is possible to realize a truly realistic and amusing baseball game.

The specific display of the strike zone SZ will be explained in the section

<Method of Displaying Strike Zone>

<Functional Configuration>

Figure 3:
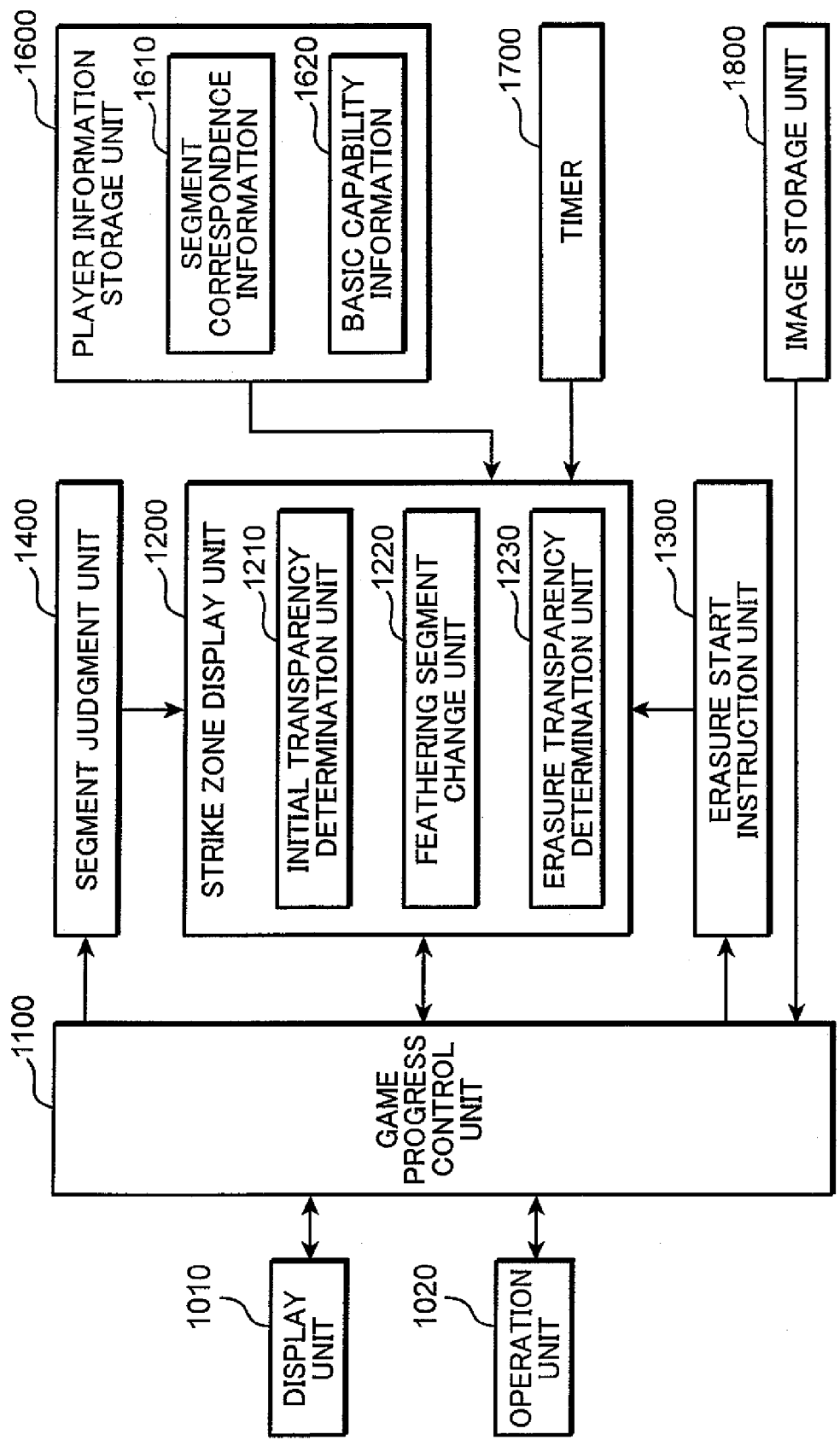
FIG. 3 is a main functional block diagram of the game device shown in FIG. 1.

The main functions of the game device 1000 upon playing a baseball game using the game device 1000 configured as described above are now explained. FIG. 3 is a functional block diagram of the game device 1000 shown in FIG. 1.

The game device 1000 is configured by comprising a display unit 1010, an operation unit 1020, a game progress control unit 1100, a strike zone display unit 1200, an erasure start instruction unit 1300, a segment judgment unit 1400, a player information storage unit 1600, a timer 1700 and an image storage unit 1800.

The strike zone display unit 1200 comprises an initial transparency determination unit 1210, a feathering region change unit 1220 and an erasure transparency determination unit 1230. Moreover, the player information storage unit 1600 stores segment correspondence information 1610 and basic capability information 1620.

The display unit 1010 includes the television 200 shown in FIG. 1, and has the function of displaying the baseball field, player characters, text, diagrams and the like on the television monitor 21 according to commands from the game progress control unit 1100.

The operation unit 1020 includes the controller 19 and the like, and has the function of detecting the various input operations that are required for the game player to advance the game, and notifying this to the game progress control unit 1100.

For example, when the game player is playing offense and the game device s playing defense, the operation unit 1020 detects a moving command for moving the ball meeting cursor K and a batting command for deciding the timing of hitting the ball object BL. Moreover, when the game player is playing defense and the game device is playing offense, the operation unit 1020 detects a pitching start command for causing the pitcher character to start its pitching motion, and a segment setting command for setting the segment of the ball object BL.

The game progress control unit 1100 has a function of performing the overall control for advancing the baseball game, and a function that is unique to this invention; for example, a function of notifying, when the pitcher character CL2 releases the ball object BL, the erasure start instruction unit 1300 to such effect.

Specifically, for example, when the game player is playing offense, the game progress control unit 1100 issues a command to the strike zone display unit 1200 for displaying the strike zone SZ according to the capability of the batter character at bat. When it becomes a predetermined timing, the game progress control unit 1100 causes the pitcher character CL2 displayed on the display unit 1010 to start its pitching motion, sets the trajectory of the ball object BL, and moves and displays the ball object BL on the display unit 1010 according to the set trajectory.

Moreover, for example, when the game player is playing defense, the game progress control unit 1100 causes the pitcher character CL2 displayed on the display unit 1010 to start its pitching motion when a pitch start command is input from the game player into the operation unit 1020, sets the trajectory of the ball object BL according to the segment setting command that was input by the game player, and moves and displays the ball object BL on the display unit 1010 according to the set trajectory.

The strike zone display unit 1200 has a function of displaying the strike zone SZ on the display unit 1010 via the game progress control unit 1100.

The strike zone display unit 1200 has three functions in relation to the display of the strike zone SZ.

The first function is the function of displaying the strike zone SZ according to the capability of the batter character CL1 when the batter character CL1 steps up to the plate. The strike zone SZ that is initially displayed when the batter character CL1 steps up to the plate is hereinafter referred to as the "initial strike zone SZ".

Moreover, the second function is the function of gradually erasing the displayed strike zone SZ from the time that the pitcher character CL2 pitches the ball object BL.

Moreover, the third function is the function of displaying a strike zone SZ in which the size of the region showing the unskillful segment of the batter character CL1 in the initial strike zone; that is, the region that was displayed after increasing the transparency (hereinafter referred to as the "feathering region") was changed according to the pitched segment. The strike zone SZ in which the feathering region was changed within the strike zone SZ is hereinafter referred to as the "changed strike zone SZ".

The initial transparency determination unit 1210 has a function of deciding, in the first function, the transparency of the initial strike zone SZ according to the capability of the batter character CL1.

The feathering region change unit 1220 has a function of determining, in the third function, whether to change the feathering region.

The erasure transparency determination unit 1230 has a function of instructing, in the second function, the timing and transparency when the strike zone SZ is to be gradually erased.

Details regarding these three functions of the strike zone display unit 1200 will be explained in the sections of <Method of displaying strike zone>, <Method of erasing strike zone> and <Method of changing feathering region> with reference to the drawings.

The erasure start instruction unit 1300 is a function of instructing the strike zone display unit 1200 to start erasing the displayed strike zone SZ. When the erasure start instruction unit 1300 receives a notification from the game progress control unit 1100 to the effect that the pitcher character CL2 released the ball object BL, it designates a predetermined time to be used for erasing the strike zone SZ and instructs the strike zone display unit 1200 to start the erasure. This predetermined time is the time that the strike zone SZ is completely erases when such time elapses. The strike zone display unit 1200 gradually erases the strike zone SZ during the foregoing predetermined time.

In this embodiment, the erasure start instruction unit 1300 instructs the erasure start of the strike zone SZ upon receiving a notification from the game progress control unit 1100 to the effect that the pitcher character CL2 released the ball object BL, but it can also instruct the erasure start at any time from the time that the pitcher character CL2 starts its pitching motion to the time that it releases the ball object BL.

Subsequently, the segment judgment unit 1400 has a function of determining whether the ball object BL pitched by the pitcher character CL2 passed through any of the segments in the strike zone SZ, counting the number of passes for each segment, and, upon reaching a predetermined number of times, notifying that segment to the strike zone display unit 1200. However, in this embodiment, only the segment in a case where the batter character CL1 did not hit the ball object BL is determined. Note that a case of a foul ball may also be counted. Moreover, the count is performed for each at-bat.

The method of the segment judgment unit 1400 determining which segment the ball passed through will be explained in the section <Method of judging segment> with reference to the drawings.

The player information storage unit 1600 has a function of storing information concerning the player character to become the batter character, pitcher character and the like. In this embodiment, among the information concerning the player character stored in the player information storage unit 1600, the segment correspondence information 1610 and the basic capability information 1620 are used.

The segment correspondence information 1610 is information concerning the unskillful segment and skillful segment of the player character as a batter, and the basic capability information 1620 is information concerning the basic capability of the player character as a batter. Details concerning such information will be explained in the section <Player data>.

The timer 1700 is a so-called timer, and is used for measuring the time when the strike zone display unit 1200 erases the strike zone SZ.

The image storage unit 1800 has the function of storing the image data that is required upon realizing the baseball game, and, for example, stores the image data of fielding characters, batter character, bat object, background image of the baseball field, pitcher character and the like. Here, as the image data of the background image of the baseball field, for example, image data that is prepared in advance by projecting a virtual three-dimensional model that is prepared in advance from a predetermined viewpoint within the virtual three-dimensional space.

A part or all of the foregoing functions are functionally configured by the game device 1000 configured from the domestic game machine 100 and the television 200 as a result of the CPU 1 executing the computer programs stored in the recording medium 300 and the like.

<Player Data>

Data concerning the main players that are used in the game device 1000 is now explained.

Figure 4:
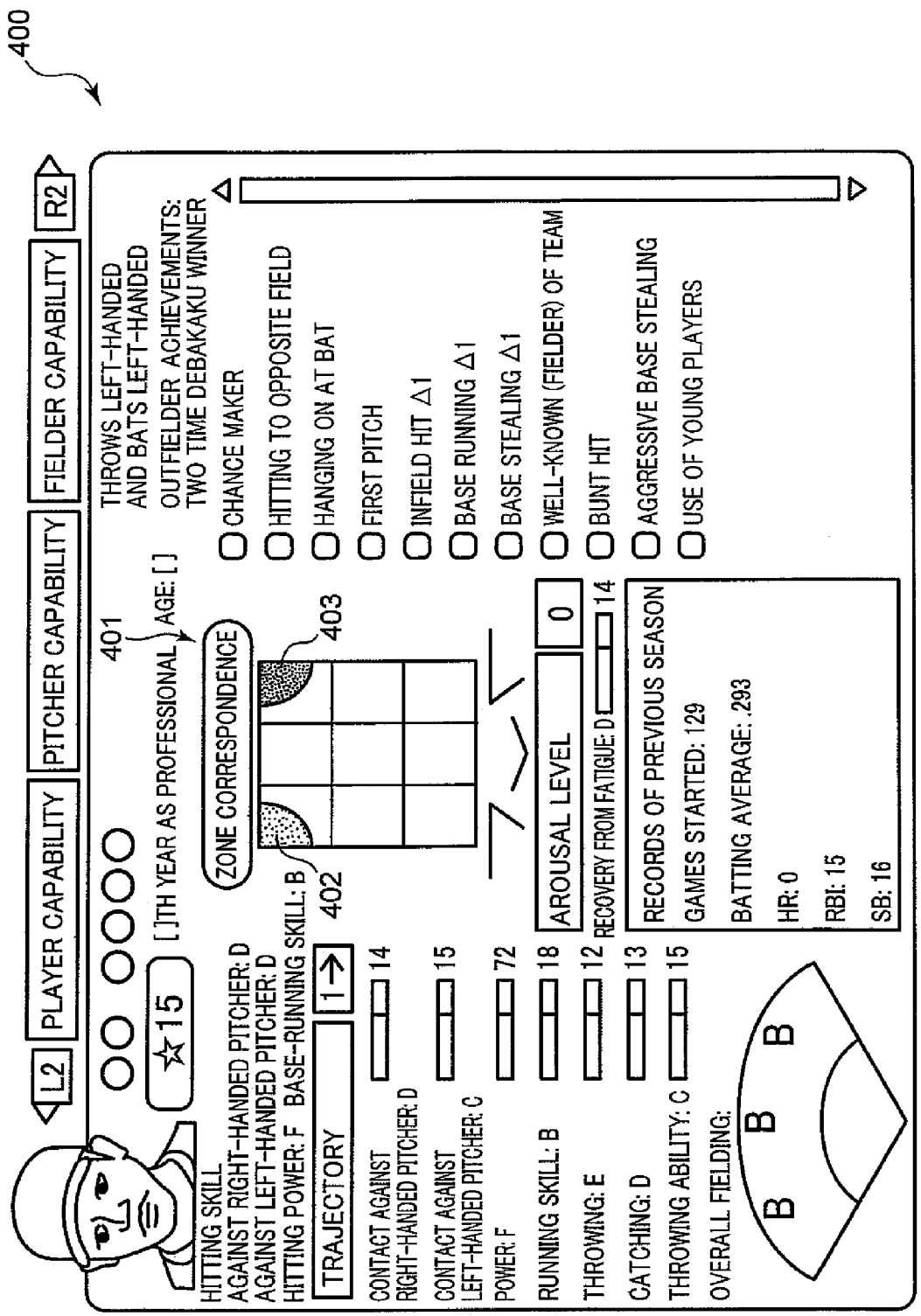
FIG. 4 is a diagram showing an example of the player introduction screen.

FIG. 4 shows an example of the player introduction screen 400 which displays, on the display unit 1010, a part of the information concerning the player character stored in the player information storage unit 1600. The player introduction screen 400 is used for the game progress control unit 1100 to read and display necessary data from the player information storage unit 1600 and the like according to the game player's operation that was detected by the operation unit 1020.

The player introduction screen 400 displays, in addition to the player character's name, age and other information, a segment correspondence 401 showing the unskillful segment and skillful segment, and various capabilities such as running skill, throwing ability, and the like.

The segment correspondence 401 shows the unskillful segment and skillful segment as a fan-shaped region. For example, the region 402 shows the unskillful segment and the region 403 shows the skillful segment.

Figures 5A, 5B:
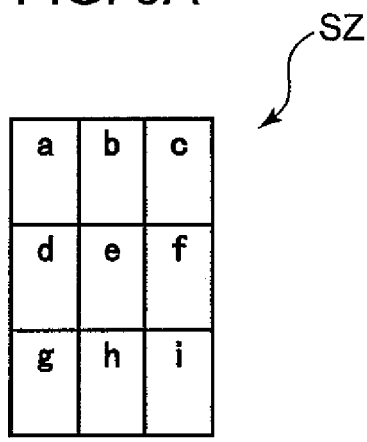
FIG. 5A is a diagram showing the respective segments of the strike zone.
FIG. 5B is a diagram showing an example of the configuration and contents of the segment correspondence information.

FIG. 5A is a diagram showing the segment of the strike zone SZ, and FIG. 5B shows an example of the configuration and contents of the segment correspondence information 1610.

The strike zone SZ of FIG. 5A is a view seen from the catcher character's side. The strike zone SZ is divided into nine regions, and each region is referred to as "segment a", "segment b" to "segment i". For example, for a right-handed batter, the segment a becomes high and inside, and for a left-handed batter, the segment c becomes high and inside.

The segment correspondence information 1610 of FIG. 5B is data showing the unskillfulness of the player character in each segment. The segment correspondence 401 of the player introduction screen 400 is displayed based on the segment correspondence information 1610.

The segment correspondence information 1610 is configured from a player identifier 1611 and segment information 1612.

The player identifier 1611 is an identifier for identifying and differentiating the individual player characters among the plurality of player characters.

The segment information 1612 shows the unskillfulness of the respective segments shown as segment a to segment i of the player character shown by the player identifier 1611. The segment information 1612 is an example of the first evaluation information.

In this embodiment, let it be assumed that the records of the player characters of the respective teams are registered.

Moreover, in this embodiment, the unskillfulness is represented with an integer of "1" to "5", and "1" shows the most unskillful segment.

For example, the player character shown as "player 01" by the player identifier 1611 considers the "segment a" to which "1" is set in the segment information 1612 to be the most unskillful segment.

Figure 6:
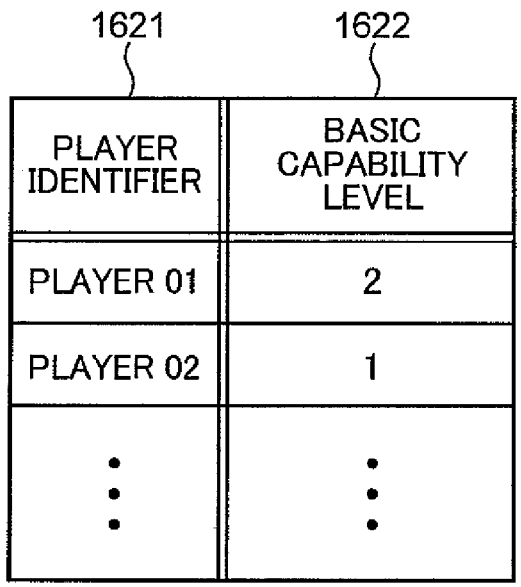
FIG. 6 is a diagram showing an example of the configuration and contents of the basic capability information.

FIG. 6 is a diagram showing an example of the configuration and contents of the basic capability information 1620.

The basic capability information 1620 is data showing the basic capability of the player character as a batter. The basic capability as a batter includes hitting skill, hitting power, base-running skill, and so on.

The basic capability information 1620 is configured from a player identifier 1621, and a basic capability level 1622.

The player identifier 1621 is an identifier for identifying and differentiating the individual player characters among the plurality of player characters.

The basic capability level 1622 shows the level of basic capability of the player character shown by the player identifier 1621. In this embodiment, the basic capability level is represented by an integer of "1" to "3", and "3" shows the highest capability. The basic capability level 1622 is an example of the second evaluation information.

For example, the player character shows as "player 02" by the player identifier 1611 has a basic capability level 1622 of "1", and this shows that the basic capability is not very high.

The segment correspondence information 1610 and the basic capability information 1620 are data which are stored in the player information storage unit 1600 in advance.

<Method of Displaying Strike Zone>

The method of displaying the strike zone SZ is now explained with reference to FIG. 7 to FIG. 12.

In this embodiment, the display mode of the strike zone SZ is decided and the strike zone SZ is displayed based on the segment correspondence information 1610 and the basic capability information 1620 of the batter character.

Foremost, for the sake of convenience of explanation, a strike zone SZ in the case of only using the segment correspondence information 1610 is explained, and a strike zone SZ in the case of using both the segment correspondence information 1610 and the basic capability information 1620 is subsequently explained.

Figure 7:
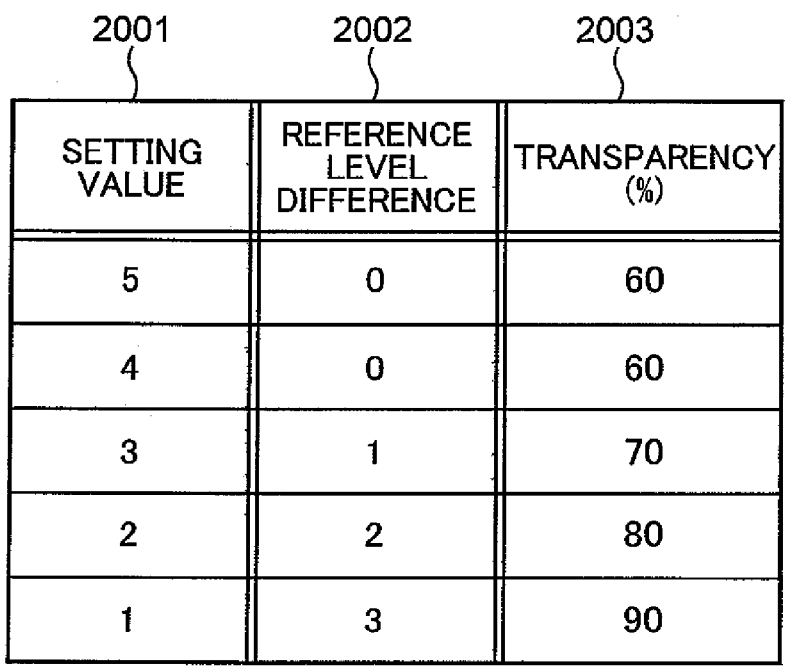
FIG. 7 is a diagram showing an example of the configuration and contents of the segment transparency table.
Figure 10A:
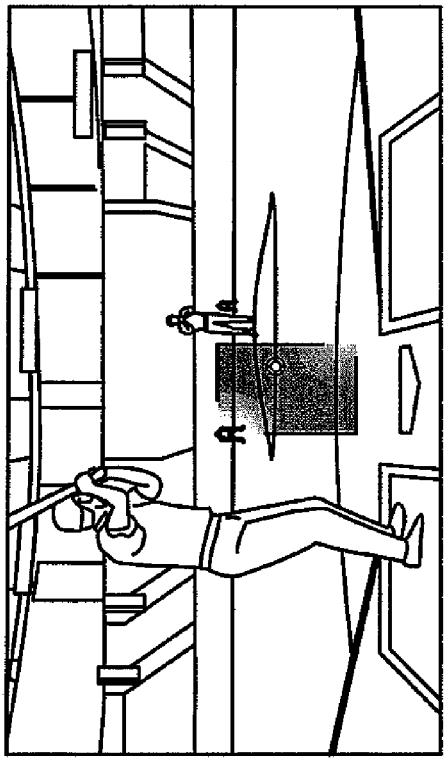
FIG. 10 is a diagram showing an example of displaying the strike zone on the game screen.
Figure 10B:
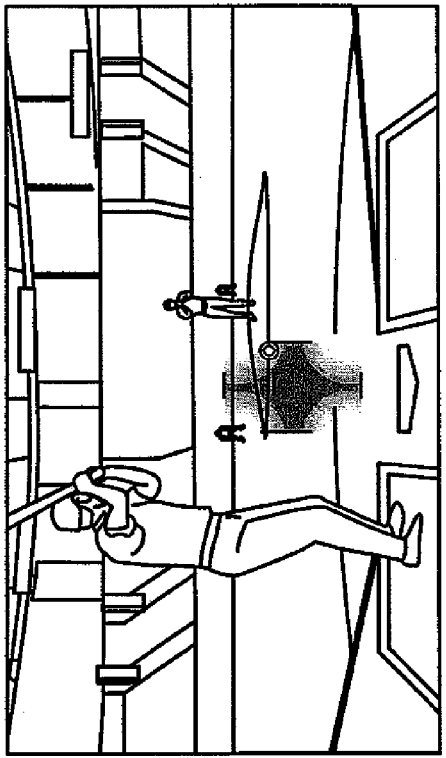
Figure 10C:
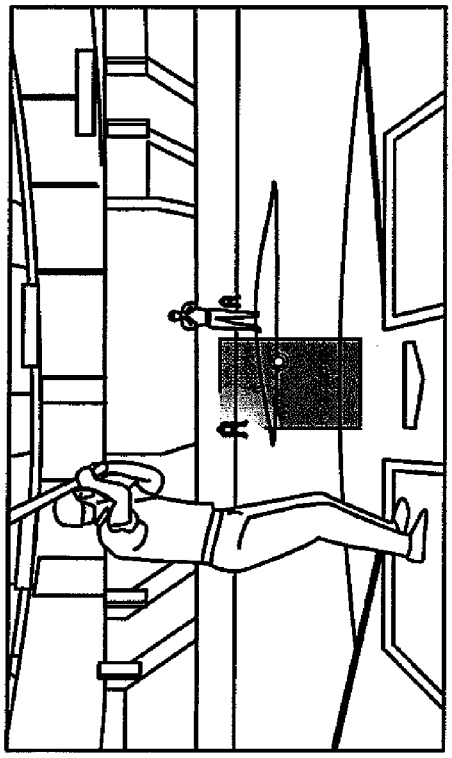
Figure 10D:
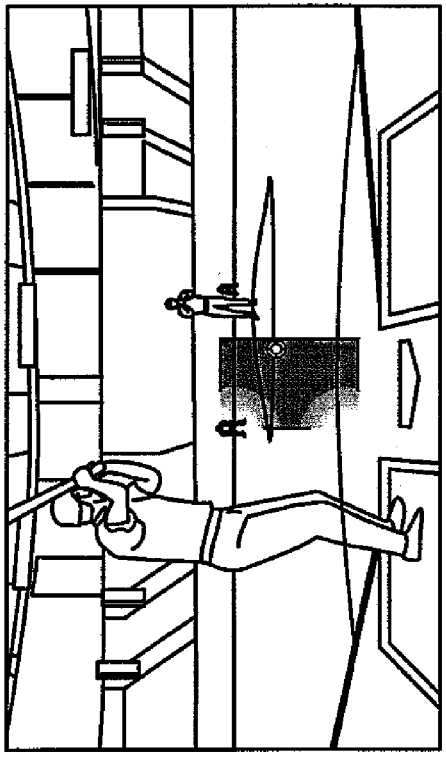

FIG. 7 is a diagram showing an example of the configuration and contents of the segment transparency table 2000.

The segment transparency table 2000 is configured from a setting value 2001, a reference level difference 2002 and a transparency 2003.

The setting value 2001 shows the unskillfulness that was set to the segment a to the segment i of the strike zone SZ. The reference level difference 2002 shows the divergence from the level to be used as the reference. This level to be used as the reference (hereinafter referred to as the "reference level") is the reference level to be used upon deciding the transparency of the segment according to the unskillfulness, and a predetermined transparency is assigned to a segment to which a value of this reference level (hereinafter referred to as the "reference level value") is set. For example, a predetermined transparency is the transparency in the case of displaying a strike zone SZ in which the unskillfulness is not reflected in the display mode. In this embodiment, the reference level value is set to "4". As a result of changing this reference level value, the unskillfulness for changing the transparency of the segment can be changed freely. The reference level value is an example of the first reference data, and the reference level difference 2002 is an example of the divergence from the first reference data.

The transparency 2003 shows the transparency of the segment. The transparency is increased as the divergence from the value shown by the reference level difference 2002; that is, as the divergence from the reference level increases.

For example, since the reference level difference 2002 is "2" with a segment in which the setting value 2001 is "2", the transparency 2003 is displayed at "80"%. Moreover, with a segment in which the setting value 2001 is "5", the unskillfulness is not lower than a reference level; that is, since it is not unskillful, it is displayed at the transparency 2003 of "60"%, which is the same as the segment in which the reference level difference 2002 is "0".

Note that, in this embodiment, the unskillfulness is set in the segment, but the skillfulness can also be set. Here, the transparency will be reduced as the divergence with the reference level increases. Moreover, the transparency may be kept the same if the setting value of the reference level difference 2002 is of a predetermined value or higher.

Moreover, the reference level is common among all players in this embodiment, but it can also be set for each player. For example, in the case of a player where the unskillfulness that was set in the segments is "1" and "2", the respective segments of the strike zone SZ will be displayed at a transparency of "80"% or "90"%. Here, the overall strike zone SZ may become too thin and it may become difficult for the game player to recognize the strike zone SZ itself. Thus, if the reference level of this player is set to "2", the transparency will be displayed at "60"% and "70"%, and it will be possible to display a strike zone SZ that can be easily recognized by the game player, and indicate the player's unskillful segment in the strike zone SZ.

The usage of the transparency is explained. For example, when the color of the pixels to be displayed on the screen is obtained by transparency (%)/100=α, background color×(1−α)+color of strike zone×α=display color is used. The color of the strike zone is a predetermined color; for example, gray. When the pixels are represented as RGB, the respective colors of R (red), G (green), B (blue) are obtained. As a result of mixing the colors as described above, the transparency of the strike zone SZ can be expressed.

How the strike zone SZ is displayed is now explained with reference to the segment transparency table 2000.

FIG. 8 and FIG. 9 are diagrams showing examples of the strike zone SZ showing the "reference level difference" of the respective segments, the strike zone SZ showing the "transparency" of the respective segments, and the strike zone SZ that is "displayed". FIGS. 8A to 8C and FIGS. 9A and 9B show five examples.

The strike zone SZ of the "reference level difference" is a result of indicating the difference between the unskillfulness set as the segment information 1612 and the reference level value in the respective segments.

The strike zone SZ of the "transparency" indicates the transparency according to the reference level difference described in the respective segments of the strike zone SZ of the "reference level difference". This transparency is decided by referring to the segment transparency table 2000 (refer to FIG. 7). For example, when the reference level difference is "2", the value of "80"%, which is set as the transparency 2003 of the record where such difference "2" is set as the reference level difference 2002, is indicated as the transparency.

The strike zone SZ of the "display" shows an example of the strike zone SZ that is displayed on the game screen.

Basically, the region of the respective segments is displayed at the transparency indicated in the respective segments. Here, when the adjacent region and transparency are different, gradation is provided so that the boundary becomes hard to spot. Moreover, in this embodiment, the corner segments of the strike zone SZ; namely, the four segments of segment a, segment c, segment g and segment i are displayed in as fan-shaped regions. With a fan-shaped region, for example, it gradually becomes thick from the corner of the strike zone SZ toward the center of the strike zone SZ, and, at the arced portion, the transparency is continued inside and outside the arc. The portion with the highest transparency in the fan-shaped region; that is, the corner of the strike zone SZ show the transparency of that segment.

Note that FIG. 8 and FIG. 9 show the frame around the strike zone SZ so that the segments are clearly visible, but during the actual display, the transparency is increased and displayed according to the transparency of the region.

FIG. 8A is an example of a case where the high and inside segment is an unskillful segment for a right-handed batter, and FIG. 8B is an example where the high and inside segment and the low and outside segment are unskillful segments, and the high and inside segment is the more unskillful segment among the two. Moreover, FIG. 8C is an example where the high and inside and low and inside segments are the unskillful segments.

Similarly, FIG. 9A is an example where the high and inside segment and the low and outside segment and the high and outside segment and the low and outside segment are unskillful segments for a right-handed batter, and FIG. 9B is an example where the high and inside corner segment is the unskillful segment, and the high and outside segment is the skillful (not unskillful) segment.

FIGS. 10A to 10D respectively show the examples upon displaying, on the game screen, the strike zone SZ shown in FIGS. 8A, 8B, 8C and FIG. 9A.

The strike zone SZ in the case of using the segment correspondence information 1610 and the basic capability information 1620 is now explained.

FIG. 11 is a diagram showing an example of the configuration and contents of the basic capability segment transparency table 2100.

The basic capability segment transparency table 2100 is configured from a setting value 2101, a reference level difference 2102, a basic capability level 2103 and a transparency 2104. The basic capability segment transparency table 2100 is an example of deciding the transparency based on the segment information 1612 (first evaluation information), and the basic capability level 1622 (second evaluation information) that was weighted lower than the segment information 1612.

The setting value 2101 shows the unskillfulness that was set to the segment a to the segment i of the strike zone SZ as with the setting value 2001 of FIG. 7.

The reference level difference 2102 shows the divergence from the level to be used as the reference as with the reference level difference 2002 of FIG. 7.

The basic capability level 2103 shows the level of "1" to "3" that is set as the basic capability level 1622 for each player in the basic capability information 1620. "3" shows the highest level.

The transparency 2104 shows the transparency of the segment to which the reference level difference 2002 corresponds with the transparency 2003 of FIG. 7.

For example, in the case of only using the segment correspondence information 1610, since the reference level difference 2002 is "2" with a segment in which the setting value 2001 is "2", the transparency 2003 is displayed at "80"%. Nevertheless, in the case of additionally using the basic capability information 1620, the transparency 2104 will be "86"% for a player in which the basic capability level 1622 is "1", and the transparency 2104 will be "80"% for a player in which the basic capability level 1622 is "3". In other words, the transparency is increased for players with a low basic capability level 1622.

FIG. 12 shows an example of the display of the strike zone SZ where, although the contents of the segment information 1612 are the same, the basic capability level 1622 is different.

Figure 12A:
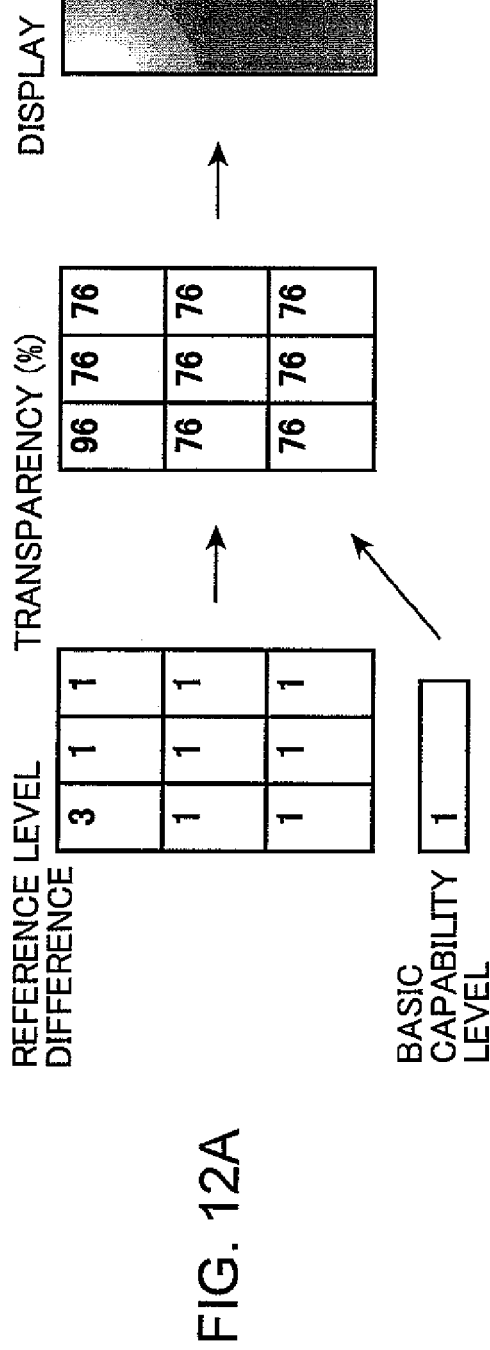
FIG. 12 is a diagram showing a display example of the strike zone which gives consideration of the basic capability.
Figure 12B:
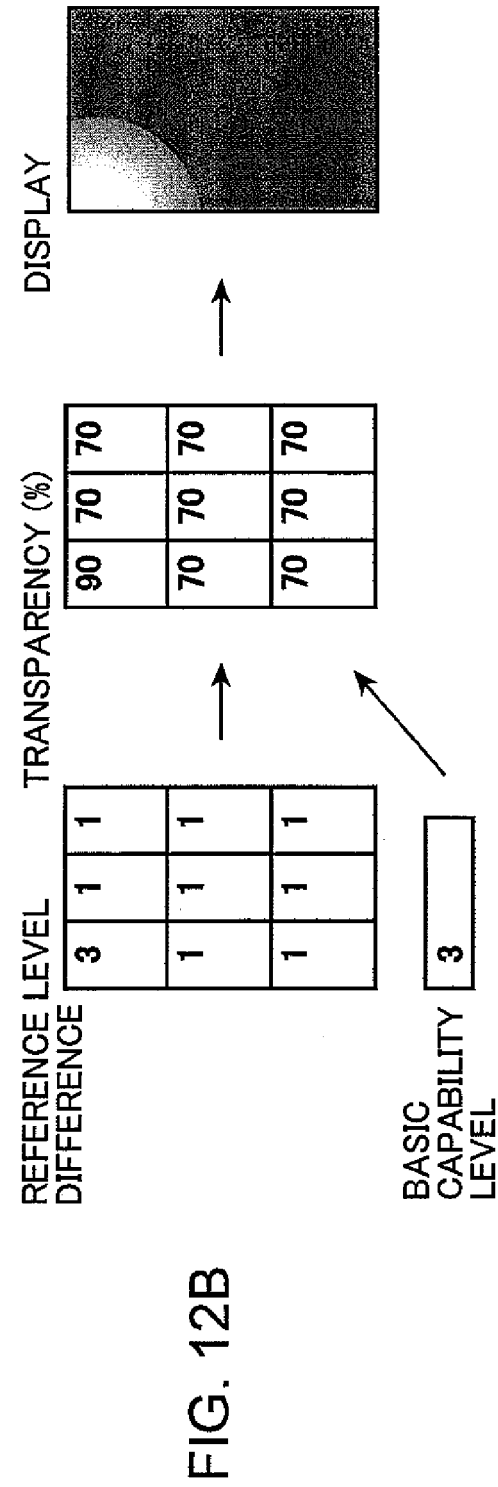

FIG. 12A shows the strike zone SZ when the basic capability level 1622 is "1", and FIG. 12B shows the strike zone SZ when the basic capability level 1622 is "3".

Since the segment information 1612 is the same, the basic difference level that is indicated in the respective segments of the strike zone SZ of the "basic level difference" will be the same. Nevertheless, since the basic capability level 1622 is different, the transparency that is indicated in the respective segments of the strike zone SZ of the "transparency" will be different. Accordingly, the strike zone SZ of the "display" will also be different.

As shown in this example, with the displayed strike zone SZ, the transparency will be lower in the case where the basic capability level 1622 is "3" in comparison to the case where it is "1".

The foregoing basic capability segment transparency table 2100 is stored in the internal area of the strike zone display unit 1200. Note that the strike zone SZ can also be displayed by only using the segment correspondence information 1610. Here, the segment transparency table 2000 is stored in the internal area of the strike zone display unit 1200.

<Method of Erasing Strike Zone>

The method of erasing the strike zone SZ is now explained with reference to FIG. 13 to FIG. 15. Here, for the sake of convenience of explanation, the explanation is provided only by using the strike zone SZ of the "transparency".

In this embodiment, the erasure of the strike zone SZ is started from the time the pitcher character CL2 releases the ball object BL, and it will be completely erased before the ball object BL reaches the strike zone SZ.

For example, in FIG. 13, let it be assumed that the time from the time that the ball object BL is released to the time that the strike zone SZ must be erased is t2. In addition, let it be assumed that the transparency of the overall strike zone SZ will be increased by "10"% at a time, each time t1 (t1<t2) lapses, until the t2 lapses. This "10"% is a value where the transparency of all segments will exceed 100% upon the lapse of t2.

As shown in FIG. 13, the segments are erased sequentially from the segment with the highest transparency, and the strike zone SZ is erased upon the lapse of t2.

Specifically, the initial strike zone SZ500 is displayed when the ball object BL is released, and, when "t1" lapses, the overall transparency increases, and displayed is the strike zone SZ501 in which the region corresponding to the segment a was erased. In addition, when "t1" lapses, the overall transparency increases further, and displayed is the strike zone SZ502 in which the region corresponding to the segment i was erased. In addition, when "t1" lapses, the transparency of the region corresponding to all segments becomes 100%, and the strike zone SZ503 is erased.

FIG. 14 shows an example of the game screen displaying the strike zone SZ that is gradually erased from the time that the pitcher character CL2 released the ball object BL.

Figure 14A:
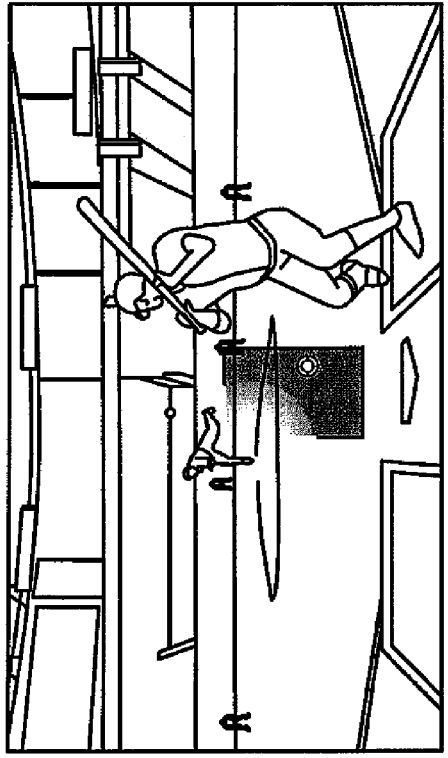
FIG. 14 is a diagram showing the game screen from which the strike zone was erased.
Figure 14B:
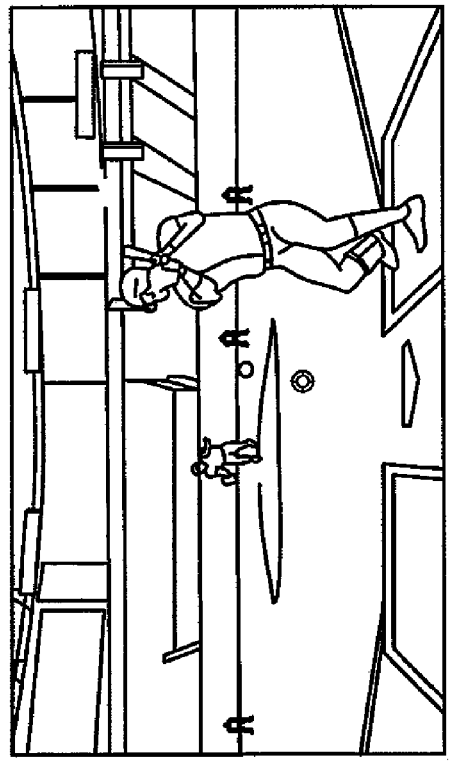
Figure 14C:
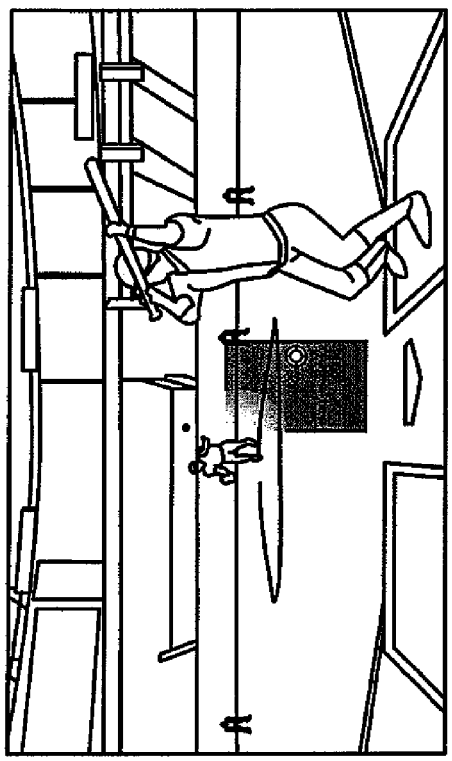
Figure 14D:
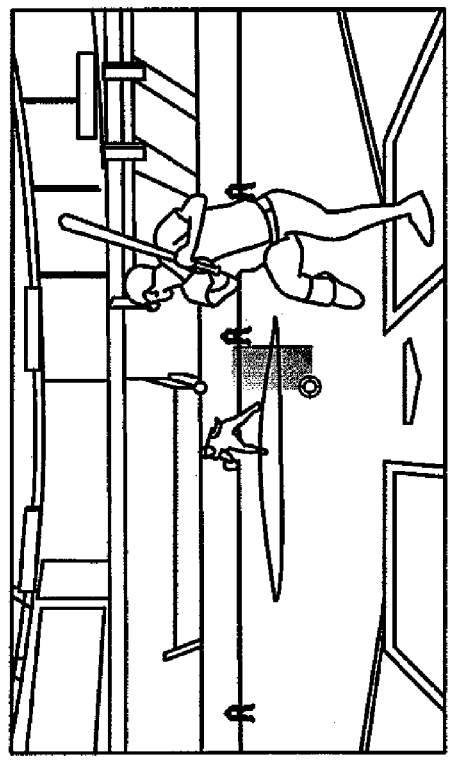

FIGS. 14A, 14B, 14C, 14D are sequential screens pursuant to the lapse of time. FIG. 14A displays the initial strike zone SZ, and the strike zone SZ is erased sequentially in FIG. 14B and FIG. 14C. In FIG. 14D, the strike zone SZ is completely erased.

An example of the change in time until the full erasure according to the initial strike zone SZ is now explained with reference to FIG. 15. In other words, this example shows that a region in which the transparency of the initial strike zone SZ is low will take longer for its erasure.

The initial strike zone SZ of FIG. 15B is the strike zone SZ having a portion with lower transparency than the initial strike zone SZ of FIG. 15A.

As shown in FIG. 15, the strike zone SZ of FIG. 15B is not completely erased at the time that the strike zone SZ of FIG. 15A is completely erased.

Specifically, when the ball object BL is released, the initial strike zone SZ510 is displayed in FIG. 15A, and the initial strike zone SZ520 is displayed in FIG. 15B.

When "t1" lapses, the transparency of the overall strike zone SZ will increase. In FIG. 15A, displayed is the strike zone SZ511 in which the region corresponding to the segment a was erased, and, in FIG. 15B, although the transparency is increased and the image is thinned, displayed is the strike zone SZ521 in which its entirety is displayed.

In addition, when "t1" lapses, the transparency of the overall strike zone SZ increases further. In FIG. 15A, displayed is the strike zone SZ512 in which the regions corresponding to the segment a and the segment i were erased, and, in FIG. 15B, displayed is the strike zone SZ522 in which the region corresponding to the segment a was erased.

In addition, when "t1" lapses, in FIG. 15A, the transparency of the region corresponding to the all segments becomes 100%, and the entire strike zone SZ513 is erased. Meanwhile, in FIG. 15B, displayed is the strike zone SZ523 in which the regions corresponding to the segments other than the segment c were erased. When "t2" lapses, in FIG. 15B also, the transparency region corresponding to all segments becomes 100%, and the entire strike zone SZ524 is erased.

As described above, since a skillful segment is displayed for a long time and an unskillful segment is erased quickly, it becomes difficult to hit the ball object BL that is pitched to an unskillful segment. In other words, realized is a game that reflects the skillfulness and unskillfulness of the batter character CL1 in each segment. Moreover, since the time that the strike zone SZ is displayed is differed according to the capability of the batter character CL1, realized is a game that reflects the player's capability.

<Method of Changing Feathering Region>

The method of reducing the feathering region of the strike zone SZ; that is, reducing the size of the region corresponding to the unskillful segment is now explained with reference to FIG. 16 to FIG. 18.

In this embodiment, the region showing the unskillful segment of the batter character CL1 in the initial strike zone; that is, the size of the feathering region is changed according to the pitched segment.

The cases of reducing the feathering region are now explained with reference to FIG. 16.

FIGS. 16A to 16E show the strike zone SZ, and FIGS. 16A to 16E show the sequential change thereof.

Figure 16A:
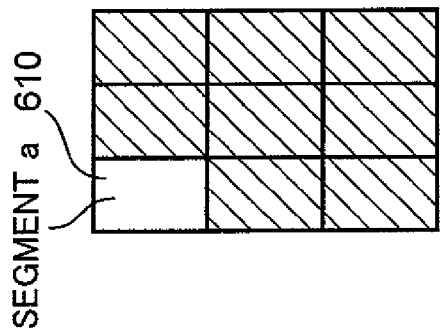
FIG. 16 is a diagram showing an example of changing the feathering region.

Foremost, let it be assumed that the strike zone SZ of FIG. 16A is the initial strike zone SZ, and that the segment a is the unskillful segment. In the initial strike zone SZ, the feathering region 610 of the segment a is the same as the region of the segment a.

Figure 16B:
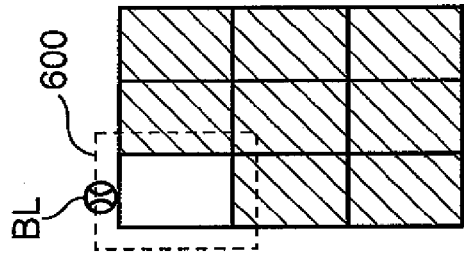

FIG. 16B shows the place where the first pitch of the ball object BL passed through. As shown in FIG. 16B, when the ball object BL passes through the "expanded region 600 of segment a" (refer to dotted rectangle) covering the segment a and surrounding region as the unskillful segment, as shown in subsequent FIG. 16C, the feathering region of the segment a is reduced to a state of coming in contact with the outline box of the strike zone SZ to achieve a feathering region 611. Note that, in the case of the segment e, the center is left as is during the reduction.

Figure 16C:
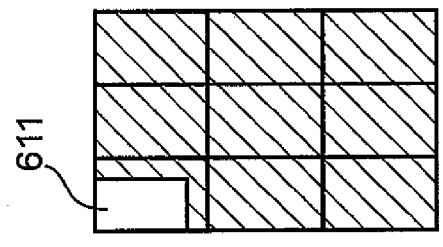

In other words, when the batter character CL1 steps up to the plate, the initial strike zone SZ shown in FIG. 16A is displayed. Let it be assumed that the pitcher character CL2 released the ball object BL and it passed through the expanded region 600 as shown in FIG. 16B. Next, when the batter character CL1 holds up the bat object BT, as shown in FIG. 16C, a changed strike zone SZ with a smaller feathering region is displayed.

Figure 16D:
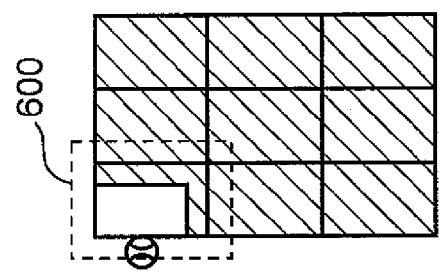
Figure 16E:
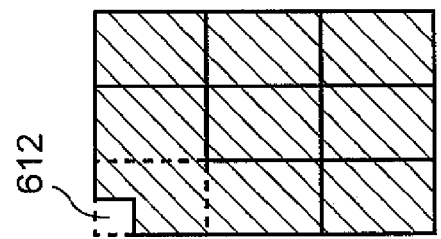

Subsequently, when the second pitch passes through the expanded region 600 of the segment a as shown in FIG. 16D, the feathering region of the segment a is reduced as shown in FIG. 16E to achieve a feathering region 612.

In other words, when the ball passes through the unskillful segment a or near the segment a, an actual batter will gradually become accustomed and be able to see the ball passing through the unskillful segment a better, and this has been expressed in the game.

Note that, with the expanded region, to what extent the segment region is to be expanded is decided in advance. For example, the expanded region is a region that is expanded vertically and horizontally from the segment in a length corresponding to the diameter of the ball.

Moreover, to which extent the display region corresponding to the unskillful segment is reduced in every display region reduction operation is decided in advance. Moreover, the minimum size is also decided in advance.

For example, with a segment such as the strike zone SZ corner as with the segment a, it is of a fan-shaped region in this embodiment. Here, the radial length of the fan shape is reduced to ⅔.

Moreover, rather than reducing the display region each time the ball passes through the expanded region of the unskillful segment, for example, it can also be reduced when two consecutive pitches pass through the expanded region of the unskillful segment.

<Method of Judging Segment>

The method of judging the segment through which the ball object BL passed is now explained. In other words, whether the ball object BL passed through an expanded region of the unskillful segment is judged.

Figure 17:
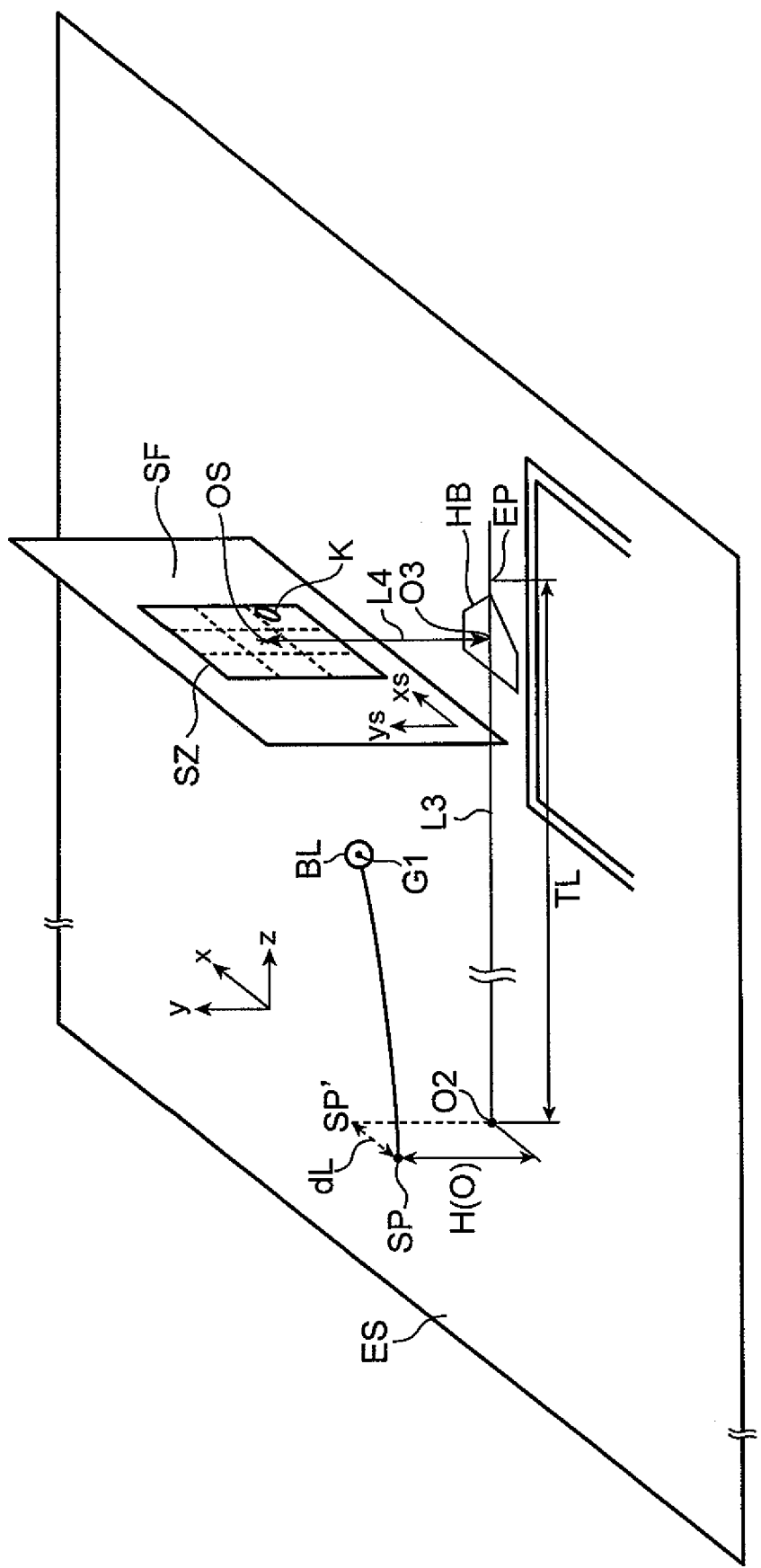
FIG. 17 is a diagram showing a virtual three-dimensional space where the baseball game is carried out by the game device of an embodiment of the present invention.

FIG. 17 is a diagram showing the virtual three-dimensional space (game space) where the baseball game is carried out by the game device 1000.

Note that z shown in FIG. 17 represents a direction that is parallel to the straight line L3 that connects the center O2 of the pitcher's mound and the center O3 of the home base HB in the virtual three-dimensional space, and shows the advancing direction of the ball object BL. Moreover, y shows the vertical direction, and x shows the direction that is orthogonal to the vertical direction and the advancing direction. Here, the x-z plane is parallel to the ground level ES, and the x-coordinate and the z-coordinate define the respective positions of the ground level ES. Moreover, the vertical direction is a direction that is orthogonal to the ground level ES.

In this embodiment, y increases as it is distanced from the ground level ES. Moreover, z increases as it heads toward the center O3 of the home base HB from the center O2 of the pitcher's mound. Moreover, when viewing x from a+z direction, for example, the left side is + and the right side is −. Moreover, let it be assumed that the origin of the x, y, z-axis is the center O2.

The strike zone SZ, for example, passes through the center O3 of the home base HB and is set on the movable region SF as a plane that is parallel to the x-y plane, and is set in the game space based on the actual strike zone of a baseball game.

The center OS of the strike zone SZ is positioned a distance (L4) away from the center O3 of the home base HB in the +y direction, and corresponds to the dead center of the strike zone.

The ball meeting cursor K moves on the movable region SF according to the move command that is input to the operation unit 1020. Moreover, the size of the movable region SF may be a size that is slightly larger than the size of the strike zone SZ.

The movable region SF has a two-dimensional coordinate system that is separate from the game space, and the xs coordinates and the ys coordinates define the position within the movable region SF.

While the game is being executed, the pitcher character CL2 and the batter character CL1 shown in FIG. 2 are disposed on the ground level ES. Moreover, a catcher character and an umpire character are disposed on the +z side from the home base HB.

If the pitcher character CL2 is right handed, for example, the point SP that is separated a distance dL in the −x direction from the point SP' that is separated by H (O) from the center O2 of the pitcher's mound in the y direction will become the release point of the ball object BL by the pitcher character CL2.

Figure 18:
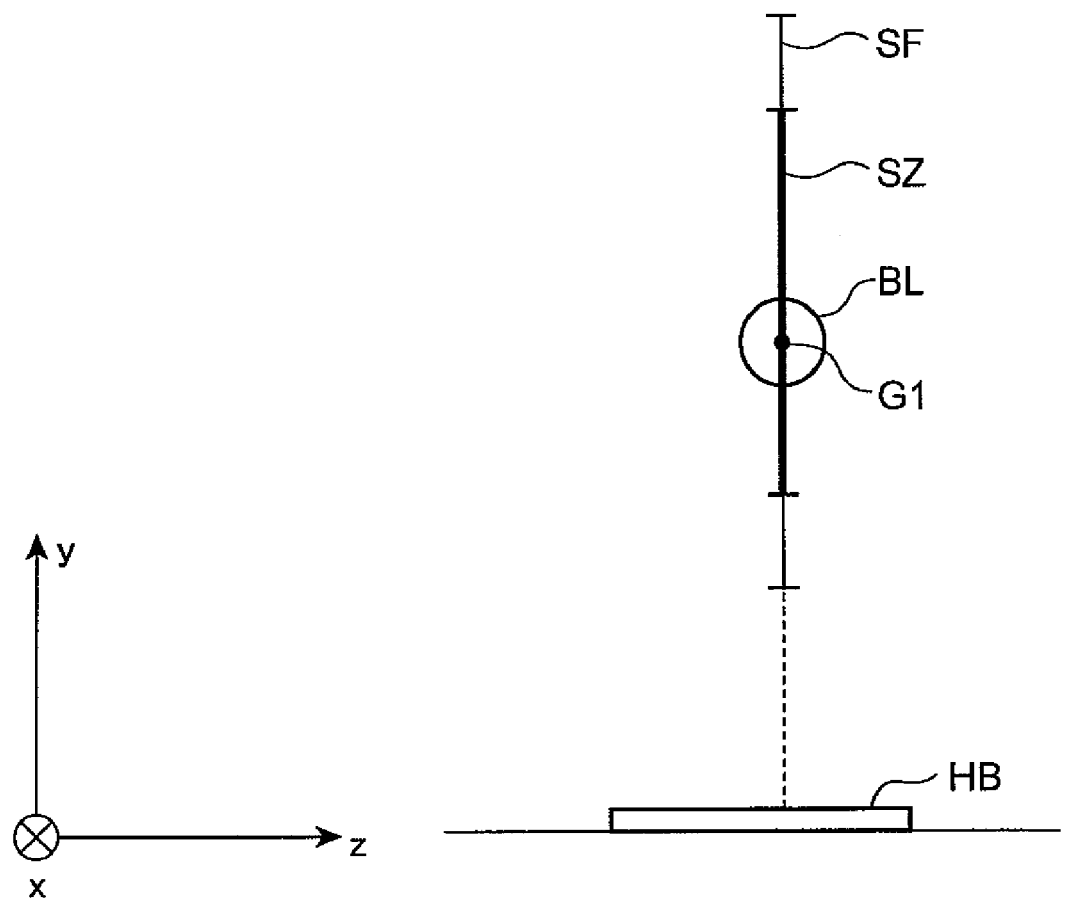
FIG. 18 is an explanatory diagram which views the virtual three-dimensional space shown in FIG. 17 from the x-axis direction.

FIG. 18 is a diagram which views the virtual three-dimensional space shown in FIG. 17 from the x-axis direction. The game progress control unit 1100 determines, as the batting time, the lapse of a predetermined time from the time that the batting command was input to the operation unit 1020 to the time required for the batter character CL1 to swing the bat object BT and the bat object BT reaching the movable region SF.

Subsequently, the batting determination unit 62 determines that the ball object BL was hit by the batter character CL1 when the ball object BL and the ball meeting cursor K overlap at the batting timing. Moreover, when the ball object BL and the ball meeting cursor K do not overlap at the batting timing, it is determined that the ball object BL was not hit.

When it is determined that the ball object BL was not hit, the segment is determined based on the pass point where the center of gravity G1 of the ball object BL passed through the movable region SF.

The segment (one segment among segment a to segment i) containing the pass point becomes the segment of the ball object BL (refer to FIG. 5A). In the case of this embodiment, the segment is determined in the expanded region of the respective segments. Accordingly, since the expanded region of the segment overlaps with the adjacent segment, there are cases where two segments are selected.

Note that it is also possible to determine that the ball object BL passed through the expanded region 600 so as along as at least a part of the ball object BL is overlapping with the expanded region 600 (refer to FIG. 16).

<Operation>

The operation of the game device 1000 is now explained.

FIG. 19 is a flowchart explaining the strike zone SZ display processing of the game device 1000.

The game player operates the controller 19 and performs an operation for instructing the start of the game.

The operation unit 1020 that detected the operation by the game player notifies the detected operation to the game progress control unit 1100. The game progress control unit 1100 that was notified of the operation from the operation unit 1020 determines that a game start command has been issued, reads the image data of the batter character CL1, bat object BT, background image of the baseball field, pitcher character CL2, fielder character and the like from the image storage unit 1800 and displays this on the display unit 1010, and then performs a predetermined initial setting (step S10). Here, for example, an image as shown in FIG. 2 is displayed on the display unit 1010.

When the game progress control unit 1100 detects that the batter character CL1 stepped up to the plate, it delivers the player identifier of the batter character CL1 to the strike zone display unit 1200, and gives instructions for displaying the strike zone SZ (step S11).

The strike zone display unit 1200 that received the instructions delivers the delivered player identifier to the initial transparency determination unit 1210 and requests it to decide the transparency.

The initial transparency determination unit 1210 that received the request refers to the segment correspondence information 1610 and the basic capability information 1620 stored in the player information storage unit 1600, and, as explained in the section <Method of displaying strike zone>, creates data showing the transparency of the respective segments of the strike zone SZ of the player that is shown with the delivered player identifier (refer to strike zone of "transparency" of FIG. 8 and the like).

The initial transparency determination unit 1210 that created the data showing the transparency delivers the created data to the strike zone display unit 1200.

The strike zone display unit 1200 that received the data creates display data of the initial strike zone SZ according to the transparency of the respective segments, delivers the created display data to the game progress control unit 1100, and requests the display unit 1010 to display the same.

The display unit 1010 that received the request displays the strike zone SZ at a predetermined position in the game space (step S12).

Next, the game progress control unit 1100 causes the pitcher character CL2 to start its pitching motion at a predetermined timing when the game player is playing offense, and upon being notified from the operation unit 1020 that a pitch start command was input by the game player when the game player is playing defense (step S13: NO).

When the pitcher character CL2 releases the ball object BL, the game progress control unit 1100 notifies the strike zone display unit 1200 to such effect (step S13: YES).

Here, the game progress control unit 1100 changes the display mode of the pitcher character CL2 so that the pitcher character CL2 will throw the ball object BL. Moreover, the game progress control unit 1100 sets the trajectory of the ball object BL based on the capability information of the pitcher character CL2, and moves and displays the ball object BL on the display unit 1020 according to the set trajectory.

The strike zone display unit 1200 that was notified of the pitcher character CL2's release of the ball object BL notifies the erasure start of the strike zone SZ to the erasure transparency determination unit 1230.

The erasure transparency determination unit 1230 that received the notification uses the timer 1700 to start measuring the second time "t2" and the first time "t1" (step S14: NO). The second time "t2" is the time "t2" that the strike zone SZ must not be erased as shown in FIG. 13 and the like, and the first time "t1" is the elapsed time "t1" showing the timing of increasing the transparency.

The erasure transparency determination unit 1230 that detected the lapse of the first time "t1" (step S14: YES), delivers the transparency to be lowered; for instance, "10%", to the strike zone display unit 1200, and notifies the timing of lowering the transparency. Moreover, the erasure transparency determination unit 1230 uses the timer 1700 to once again start measuring the first time "t1" (step S14: NO).

The strike zone display unit 1200 that received the notification creates data of the strike zone SZ in which the transparency of the respective segments of the strike zone SZ that is currently displayed is lowered by "10%", delivers the created display data of the strike zone SZ to the game progress control unit 1100, and requests the display unit 1010 to display the same.

The display unit 1010 that received the request displays the strike zone SZ at a predetermined position in the game space (step S15).

The erasure transparency determination unit 1230 repeats the processing of S15 until it detects the second time "t2" (step S16: NO). As explained in the section <Method of erasing strike zone> described above, the strike zone SZ will gradually disappear.

The erasure transparency determination unit 1230 that detected the lapse of the second time "t2" (step S16: YES), notifies the strike zone display unit 1200 to erase the strike zone SZ if it is still being displayed. Note that, normally, the strike zone SZ is not displayed at the lapse of the second time "t2".

If the strike zone SZ is still being displayed, the strike zone display unit 1200 that received the notification requests the game progress control unit 1100 to request the display unit 1010 to erase the strike zone SZ.

The display unit 1010 that received the request erases the strike zone SZ from a predetermined position in the game space (step S17).

Next, as explained in the section <Method of judging segment> described above, the game progress control unit 1100 determines whether the batter character CL1 was able to hit the ball object BL. When it is determined that the batter character CL1 was unable to hit the ball object BL (step S18: NO), the coordinate value of the pass point of the ball object BL in the movable region SF is delivered to the segment judgment unit 1400.

The segment judgment unit 1400 that received the coordinate value of the pass point determines which segment the ball object BL passed through. Here, the segment judgment unit 1400 determines whether the ball object BL passed through the expanded region of the respective segments (refer to FIG. 16).

Since the expanded region partially overlaps with the adjacent segment, the segment judgment unit 1400 selects one or two segments as the segment where the ball object BL passed through.

Subsequently, the segment judgment unit 1400 counts the number of times that the ball object BL had passed through each segment, and, upon reaching a predetermined number of times, delivers that segment to the strike zone display unit 1200 (step S19). In this embodiment, when the ball object BL passes through a segment once, that segment is notified.

The strike zone display unit 1200 that received the notification delivers the received segment to the feathering region change unit 1220, and requests the change of the feathering region.

The feathering region change unit 1220 that received the request notifies the strike zone display unit 1200 to display that segment by reducing the feathering region upon receiving a segment in which the reference level difference is a predetermined region or higher; for example, "3" or higher (step S20: YES).

The strike zone display unit 1200 that received the notification reduces the region where the transparency is to be increased and displayed, and displays the changed strike zone SZ as explained in the section <Method of changing feathering region> described above (step S21).

Meanwhile, the feathering region change unit 1220 that received the notification notifies the strike zone display unit 1200 to refrain from reducing the feathering region upon receiving a segment in which the reference level difference is not a predetermined region or higher (step S20: NO).

The strike zone display unit 1200 that received the notification displays the (latest) strike zone SZ that was being displayed most recently (step S31).

Subsequently, the game progress control unit 1100 causes the pitcher character CL2 to start its pitching motion (step S13), and advances the game.

In step S18, when it is determined that the batter character CL1 was able to hit the ball object BL (step S18: YES), the game progress control unit 1100 sets the trajectory of the ball object BL, and displays the moving ball object BL on the display unit 1010 according to the set trajectory.

When the at-bat is to continue due to the ball object BL being a foul ball or the like (step S22: YES), the game progress control unit 1100 requests the strike zone display unit 1200 to display the strike zone SZ.

The strike zone display unit 1200 that received the request displays the strike zone SZ that was being displayed most recently (step S23).

Meanwhile, when the at-bat is not to continue as a result of getting on base or the like (step S22: NO), the game progress control unit 1100 performs batting processing (step S24), and the game progress control unit 1100 continues the game (step S25: NO). When the game progress control unit 1100 detects the game end or an operation for ending the game from the operation unit 1020 (step S25: Yes), it ends the game.

The present invention was appropriately and sufficiently explained with reference to the drawings and through the embodiments in order to express this invention, but it should be recognized that the change and/or improvement of the foregoing embodiments can be easily achieved by a person skilled in the art. Accordingly, so as long as the change or improvement made by a person skilled in the art is not of a level that deviates from the scope of claims of the present invention, such change or improvement should be interpreted as being covered by such scope of claims.

Note that, in the embodiments, although the game program is stored in the recording medium 300, the configuration may also be such that the respective programs are downloaded, via a network and communication interface circuit or the like, from a server (not shown) managing such programs.

Moreover, in the embodiments, when erasing the strike zone SZ, the strike zone SZ is gradually erased by increasing the transparency by a predetermined transparency, for example, 10% at a time. Here, the time required until the strike zone SZ is erased is made to differ by reflecting the capability of the batter character CL1 in the transparency of the strike zone SZ (refer to FIG. 15).

Nevertheless, the time required until the strike zone SZ is erased can also be differed by a different method. For example, FIG. 20 is a diagram showing an example of causing the time required until the strike zone SZ, which only uses the segment correspondence information 1610, is erased to differ according to the basic capability information 1620. FIG. 20A shows an example of increasing the transparency by 10% at a time, and FIG. 20B shows an example of increasing the transparency by 8% at a time. In other words, by lower the transparency to be increased as the basic capability level of the batter character CL1 is higher, the time until the strike zone SZ is erased is prolonged.

Moreover, in this embodiment, the unskillfulness based on segment is shown as "1" to "5", the reference level value is set to "4", and the transparency is decided according to the divergence from the reference level value. Nevertheless, the divergence can also be set with other methods. An example is shown in FIG. 21. In FIG. 21A, the reference level value is set to "10", an integer smaller than 10 shows the unskillfulness, and the segment set to "6" shows the most unskillful segment. Moreover, in FIG. 21B, the reference level value is set to "0", the integer is used to show the unskillfulness, and the segment set to "4" shows the most unskillful segment. In FIG. 21C, the reference level value is set to "9", the integer small than 9 shows the unskillfulness, and the segment set to "1" shows the most unskillful segment. In FIG. 21D, the reference level value is set to "1", an integer greater than 1 shows the unskillfulness, and the segment set to "9" shows the most unskillful segment.

Moreover, in this embodiment, the basic capability information 1620 shows the numerical value of the player's capability, but it can also be data where the capability is higher as the divergence from the reference level is greater as with the segment correspondence information 1610.

Moreover, in this embodiment, the evaluation of the batting power of the batter character CL1 is set for each segment within the strike zone SZ, but it can also be an evaluation giving consideration to the type of pitch or speed of the pitch; that is, it can also be an evaluation for each segment and according to the type of pitch, an evaluation for each segment and according to the speed of the pitch, or an evaluation for each segment, and according to the type of pitch and speed of the pitch.

The technical features of the foregoing game device can be summarized as follows.

(1) The game device according to one mode of the present invention is a game device which executes a baseball game where a batter character hits a ball object that is pitched by a pitcher character, comprising a strike zone display unit which displays a strike zone that is pre-set in a game space, and a batter information storage unit which stores, for each batter character, first evaluation information showing an evaluation of battering power in each segment showing a region within the strike zone, wherein the first evaluation information stored in the batter storage unit is data that shows a level of unskillfulness of batting for each segment and that is set so that the unskillfulness is intensified as divergence from first reference data showing a predetermined level is increased, and wherein the strike zone display unit displays the region of the strike zone corresponding to the respective segments after increasing transparency as divergence from the first reference data of the first evaluation information is increased, based on the first evaluation information on the batter character at bat among the first evaluation information stored in the batter information storage unit.

According to the game device configured as described above, data showing the level of unskillfulness of batting for each segment is stored for each batter character, and since this data is set so that the unskillfulness increases as divergence from first reference data showing a predetermined level increases, it is possible to display a strike zone by causing the region of the strike zone corresponding to the batter character's unskillful segment to be transparent according to the unskillfulness.

Since a strike zone where the region corresponding to the batter character's unskillful segment is transparent is displayed, it becomes difficult for the game player to hit the ball object with the ball meeting cursor in the batter character's unskillful segment. Accordingly, it becomes possible to reflect the skillfulness or unskillfulness of the batter character for each segment in the game, and realize a highly realistic and amusing baseball game.

(2) In the foregoing game device, the strike zone display unit displays a strike zone including an initial state of a region to be displayed after increasing the transparency, with any point in time from the pitcher character starting a pitching motion to releasing the ball object being defined as a starting point, and gradually increases the transparency and displays the strike zone pursuant to the lapse of time from the starting point.

According to the foregoing configuration, since the strike zone gradually disappears according to the lapse of time when the game player attempts to hit the ball object pitched by the pitcher character using the ball meeting cursor, it becomes more difficult for the game player to move the ball meeting cursor to the intended segment as the ball object approaches home base. Moreover, since the strike zone will disappear quickly near the unskillful segment where it is displayed with high transparency, the batting operation of the ball object in that segment becomes more difficult. Accordingly, the game player will be demanded for greater concentration at bat, and the amusement of the game can thereby be increased.

(3) In the foregoing game device, the batter information storage unit further stores, for each batter character, second evaluation information showing an evaluation of basic capability as a batter, and the strike zone display unit, upon gradually increasing the transparency, displays the strike zone so that the time until the transparency reaches an upper limit becomes longer as the evaluation value of the second evaluation information is higher.

Here, the term "upper limit" refers to the transparency where the game player is unable to recognize the overall strike zone, and, for example, refers to a case where the transparency is 100%.

According to the foregoing configuration, since it is possible to display the strike zone by giving consideration to the basic capability as a batter in addition to the level of unskillfulness of the batter character in each segment, and prolong the time that the strike zone is displayed from the time that the ball object is released from the pitcher character as the basic capability is higher, the game player can more easily move the ball meeting cursor to the intended segment as the basic capability of the batter character is higher. Accordingly, it becomes possible to reflect the basic capability of the batter character in the game, and, when there are a plurality of batter characters who are unskillful at hitting in the same segment, the transparency can be changed for each batter, a more varied and amusing game can be provided.

(4) In the foregoing game device, the batter information storage unit further stores, for each batter character, second evaluation information showing an evaluation of basic capability as a batter, and the strike zone display unit sets the transparency based on the first evaluation information, and the second evaluation information that is weighted lower than the first evaluation information in relation to the setting of the transparency, and increases the transparency as the evaluation value of the second evaluation information is lower.

According to the foregoing configuration, since it is possible to display a strike zone where the region corresponding to the unskillful segment is transparent by giving consideration to the basic capability as a batter in addition to the level of unskillfulness of the batter character in each segment, the basic capability of the batter character can be reflected in the game and the amusement can be further increased.

(5) In the foregoing game device, the strike zone display unit counts the number of times the ball object passes through the segment and a vicinity thereof corresponding to the region to be displayed after increasing the transparency, and gradually reduces the region to be displayed after increasing the transparency from the initial state as the number of times that was counted increases.

According to the foregoing configuration, when the ball object passes through an unskillful segment or near an unskillful segment, the size of the transparent region corresponding to the unskillful segment is reduced according to the number of passes, and this is a simulation where, in real baseball, when the ball is pitched to the same segment, the batter's eyes gradually get used to that segment. In other words, even in the batter character's unskillful segment, it becomes gradually easier for the game player to hit the ball object with the ball meeting cursor if the ball is repeatedly pitched to that segment. According to this kind of configuration, it is possible to express a game where the batter gradually gets used to the ball as in real baseball, and realize a more realistic and amusing baseball game.

(6) In the foregoing game device, the strike zone display unit does not reduce the size of the region to be displayed after increasing the transparency to be smaller than a predetermined size.

According to the foregoing configuration, the size of the region to be made transparent within the strike zone corresponding to the unskillful segment is not reduced to be smaller than a predetermined size. This is for limiting the strike zone to be indicated normally for an unskillful segment no matter how much the batter character gets used to that unskillful segment according to the configuration of (5) above. According to this configuration, it is possible to reflect the configuration of (5) above in the game in a manner that will not cause any unnatural phenomenon that is unreal.

(7) In the foregoing game device, the strike zone display unit displays the region to be displayed upon increasing the transparency after returning the region to the size of the initial state when the batter character newly goes to bat.

According to the foregoing configuration, since the region to be made transparent within the strike zone corresponding to the unskillful segment is displayed in the size of the initial state when the batter character newly goes to bat, for the game player, the difficult of the batter character to hit in the unskillful segment will be the same as the last at bat. In other words, it is possible to reflect in the game the situation in real baseball where, even if the batter is able to adjust to a certain unskillful segment at the last at bat, such adjustment will return to the original state with the lapse of time in the current at bat, and a more realistic and amusing baseball game can be realized.

This application is based on Japanese Patent Application Serial No. 2010-251908 filed in Japan Patent Office on Nov. 10, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game device which executes a baseball game where a batter character hits a ball object that is pitched by a pitcher character, comprising:
a strike zone display unit which displays a strike zone that is pre-set in a game space; and a batter information storage unit which stores, for each batter character, first evaluation information showing an evaluation of battering power in each segment showing a region within the strike zone, wherein the first evaluation information stored in the batter storage unit is data that shows a level of unskillfulness of batting for each segment, and that is set so that the unskillfulness is intensified as divergence from first reference data showing a predetermined level is increased, and the strike zone display unit displays the region of the strike zone corresponding to respective segments after increasing transparency as divergence from the first reference data of the first evaluation information is increased, based on the first evaluation information on the batter character at bat among the first evaluation information stored in the batter information storage unit.

2. The game device according to claim 1, wherein the strike zone display unit displays a strike zone including an initial state of a region to be displayed after increasing the transparency, with any point in time from the pitcher character starting a pitching motion to releasing the ball object being defined as a starting point, and gradually increases the transparency and displays the strike zone pursuant to the lapse of time from the starting point.

3. The game device according to claim 2, wherein the batter information storage unit further stores, for each batter character, second evaluation information showing an evaluation of basic capability as a batter, and the strike zone display unit, upon gradually increasing the transparency, displays the strike zone so that the time until the transparency reaches an upper limit becomes longer as the evaluation value of the second evaluation information is higher.

4. The game device according to claim 1, wherein the batter information storage unit further stores, for each batter character, second evaluation information showing an evaluation of basic capability as a batter, and the strike zone display unit sets the transparency based on the first evaluation information, and the second evaluation information that is weighted lower than the first evaluation in relation to the setting of the transparency, and increases the transparency as the evaluation value of the second evaluation information is lower.

5. The game device according to claim 2, wherein the strike zone display unit counts the number of times the ball object passes through the segment and a vicinity thereof corresponding to the region to be displayed after increasing the transparency, and gradually reduces the region to be displayed after increasing the transparency from the initial state as the number of times that counted increases.

6. The game device according to claim 5, wherein the strike zone display unit does not reduce the size of the region to be displayed after intensifying the transparency to be smaller than a predetermined size.

7. The game device according to claim 5, wherein the strike zone display unit displays the region to be displayed after increasing the transparency upon returning the region to the size of the initial state when the batter character newly goes to bat.

8. A computer-readable recording medium recorded with a program which causes a computer to execute a baseball game where a batter character hits a ball object that is pitched by a pitcher character, the recording medium causing the computer to function as:

a strike zone display unit which displays a strike zone that is pre-set in a game space; and a batter information storage unit which stores, for each batter character, first evaluation information showing an evaluation of battering power in each segment showing a region within the strike zone, wherein the first evaluation information stored in the batter storage unit is data that shows a level of unskillfulness of batting for each segment, and that is set so that the unskillfulness is intensified as divergence from first reference data showing a predetermined level increases, and the strike zone display unit displays the region of the strike zone corresponding to respective segments after increasing transparency as divergence from the first reference data of the first evaluation information increases, based on the first evaluation information on the batter character at bat among the first evaluation information stored in the batter information storage unit.

9. A game control method in which a game device executes a baseball game where a batter character hits a ball object that is pitched by a pitcher character, wherein the game device has a batter information storage unit which stores, for each batter character, first evaluation information showing an evaluation of battering power in each segment showing a region within a strike zone that is pre-set in a game space, the first evaluation information stored in the batter storage unit is data that shows a level of unskillfulness of batting for each segment, and that is set so that the unskillfulness is intensified as divergence from first reference data showing a predetermined level is increased, the game device being configured to execute a strike zone display step of displaying a region of the strike zone corresponding to respective segments after increasing transparency as divergence from the first reference data of the first evaluation information increases, based on the first evaluation information on the batter character at bat among the first evaluation information stored in the batter information storage unit.

* * * * *